(12) United States Patent
Zitnick, III

(10) Patent No.: US 7,593,020 B2
(45) Date of Patent: Sep. 22, 2009

(54) IMAGE EDITING USING IMAGE-WIDE MATTING

(75) Inventor: Charles Zitnick, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 11/420,999

(22) Filed: May 30, 2006

(65) Prior Publication Data

US 2007/0279650 A1 Dec. 6, 2007

(51) Int. Cl.
  G09G 5/02 (2006.01)
  G06K 9/34 (2006.01)
  G06K 9/00 (2006.01)
  G06K 9/62 (2006.01)
  G06K 9/40 (2006.01)
  G06K 9/60 (2006.01)

(52) U.S. Cl. .................. 345/592; 345/593; 382/164; 382/167; 382/225; 382/275; 382/302

(58) Field of Classification Search .......... 345/592, 345/600–602, 589, 593; 382/284, 275, 164, 382/167, 225, 302
  See application file for complete search history.

(56) References Cited

U.S. PATENT DOCUMENTS

| | | | |
|---|---|---|---|
| 5,900,953 A * | 5/1999 | Bottou et al. ............ | 358/540 |
| 6,097,853 A | 8/2000 | Gu et al. | |
| 6,128,001 A | 10/2000 | Gonsalves et al. | |
| 6,850,249 B1 | 2/2005 | Gu | |
| 6,928,192 B2 | 8/2005 | Kobilansky et al. | |
| 6,970,510 B1 | 11/2005 | Wee et al. | |
| 2004/0105594 A1 * | 6/2004 | Blake et al. ............ | 382/266 |
| 2004/0264767 A1 | 12/2004 | Pettigrew | |
| 2005/0074165 A1 * | 4/2005 | Hamburg ............... | 382/163 |
| 2005/0285875 A1 | 12/2005 | Kang et al. | |
| 2006/0022976 A1 | 2/2006 | Bredow et al. | |
| 2006/0039611 A1 | 2/2006 | Rother et al. | |
| 2008/0095429 A1 * | 4/2008 | Wilensky et al. ........ | 382/164 |

OTHER PUBLICATIONS

Awate, S. P., and R. T. Whitaker, Higher-order image statistics for unsupervised, information-theoretic, adaptive, image filtering, *IEEE Proceedings of Computer Vision and Pattern Recognition*, 2005, vol. 2, pp. 44-51.

Baudes, A., B. Coll, J.-M. Morel, A non-local algorithm for image denoising, *IEEE Proceedings of Computer Vision and Pattern Recognition*, 2005, vol. 2, pp. 60-65.

Chen, T., Y. Wang, V. Schillings, C. Meinel, Grayscale image matting and colorization, *Proceedings of Asian Conference on Computer Vision (ACCV 2004)*, Jeju Island, Korea, Jan. 27-30, 2004, pp. 1164-1169.

(Continued)

*Primary Examiner*—Kee M Tung
*Assistant Examiner*—Carlos Perromat
(74) *Attorney, Agent, or Firm*—Lyon & Harr, LLP; Richard T. Lyon

(57) ABSTRACT

An image editing technique employing a layered representation of the image is presented. The image representation includes a main pixel color layer, a secondary pixel color layer, an alpha layer and a noise layer. Generally, the pixel values of one or more pixel locations of one or more of the layers of the image representation are manipulated to effect a change. Once changed, the layers are combined to produce a revised image.

20 Claims, 14 Drawing Sheets

OTHER PUBLICATIONS

Chuang, Y.-Y., A. Agarwala, B. Curless, D. Salesin, R. Szeliski, Video matting of complex scenes, *Proceedings of the 29th Conf. on Computer Graphics and Interactive Techniques*, 2002, pp. 243-248.

Chuang, Y.-Y., B. Curless, D. H. Salesin, R. Szeliski, A Bayesian approach to digital matting, *IEEE Proceedings of Computer Vision and Pattern Recognition*, 2001, vol. 2, pp. 264-271.

Chuang, Y.-Y., D. B. Goldman, B. Curless, D. H. Salesin, and R. Szeliski, Shadow matting and compositing, *Proceedings of SIGGRAPH 2003*, pp. 494-500.

Dempster, A., N. Laird, D. Rubin, Maximum likelihood from incomplete data via the EM algorithm, *Journal of the Royal Statistical Society, Series B*, 1977, vol. 39, No. 1, pp. 1-38.

Donoho, D., De-noising by soft-thresholding, *IEEE Transactions on Information Theory*, vol. 41, No. 3, pp. 613-627.

Drori, I., D. Cohen-Or, Y. Yeshurun, Fragment-based image completion, *ACM Transactions on Graphics*, 2003, vol. 22, No. 3, pp. 303-312.

Hoiem, D., A. Efros, M. Hebert, Automatic photo pop-up, *Proceedings of SIGGRAPH 2005*, 2005, pp. 577-584.

Li, Y., J. Sun, C.-K. Tang, H.-Y. Shum, Lazy snapping, *Proceedings of SIGGRAPH 2004*, 2004, pp. 303-308.

Mallat, S. G., A theory for multiresolution signal decomposition: The wavelet representation, *IEEE Transactions on Pattern Recognition and Machine Intelligence*, vol. 11, No. 7, pp. 674-693.

Perona, P., J. Malik, Scale-space and edge detection using anisotropic diffusion, *IEEE Transactions on Pattern Recognition and Machine Intelligence*, vol. 12, No. 7, pp. 629-639.

Portilla, J., V. Strela, M. J. Wainwright, E. P. Simoncelli, Image denoising using scale mixtures of Gaussian in the wavelet domain, *IEEE Transactions on Image Processing*, 2003, vol. 12, No. 11, pp. 1338-1351.

Rother, C., V. Kolmogorov, A. Blake, Grabcut—Interactive foreground extraction sing iterated graph cuts, *Proceedings of SIGGRAPH 2004*, 2004, pp. 309-314.

Ruzon, M. A., C. Tomasi, Alpha estimation in natural images, *IEEE Proceedings of Computer Vision and Pattern Recognition*, vol. 1, pp. 18-25.

Sun, J., J. Jia, C.-K. Tang, H.-Y. Shum, Poisson matting, *Proceedings of SIGGRAPH 2004*, 2004, pp. 315-321.

Tomasi, C., and R. Manduchi, Bilateral filtering for gray and color images, *IEEE Proceedings of Int'l Conf. on Computer Vision*, 1998, pp. 839-846.

Tsin, Y., V. Ramesh, T. Kanade, Statistical calibration of CCD imaging process, *IEEE Proceedings of Int'l Conf. on Computer Vision*, 2001, vol. 1, pp. 480-488.

Wang, J., M. Cohen, An interative optimization approach for unified image segmentation and matting, IEEE Proceedings of Int'l Conf. on Computer Vision, vol. 2, pp. 936-943.

Co-pending U.S. Appl. No. 11/420,939, "Image Editing Using Image-Wide Matting," filed May 30, 2006.

* cited by examiner

IMAGE EDITING USING IMAGE-WIDE MATTING

BACKGROUND

Digital image editing is used to change the perceived appearance of objects within a scene. These changes may entail adjusting the contrast, or gamma, or any global characteristic, across the entire image. Additionally, the aforementioned changes may entail manipulating the color or brightness of individual objects. To change the appearance of a specific object or a portion of the scene, including highlights or shadows, the relevant pixels need to be identified. This also includes finding pixels that only contain a faction of the object or region of interest. For example, pixels near object boundaries may receive contribution from multiple objects, or pixels at shadow boundaries might only be partially shaded. The identification of the various sources contributing to a pixel is known as matting.

Standard matting approaches are object centric, in that the matting information is computed in a narrow region around a user identified object. Several matting techniques exist for finding object boundaries for use in object extraction and insertion. However, none of these techniques consider finding complete matting information across the entire image.

Another digital image manipulation topic that has been extensively studied is that of noise estimation and removal. Various techniques have been devised to estimate and remove noise from digital images, such as wavelet techniques, bi-lateral filtering and anisotropic smoothing. Here as well, matting is used to identify the pixels that are to undergo noise reduction, but none of the existing noise reduction techniques consider finding complete matting information across the entire image.

SUMMARY

The present image-editing technique employs a layered image representation that provides matting information across the entire image. This representation includes a main pixel color layer, a secondary pixel color layer, an alpha layer and a noise layer. Generally each pixel location of the main pixel color layer is assigned a color value that reflects the majority color contribution for the pixel at the location. Each pixel location of the secondary pixel color layer is assigned a color value that reflects a minority contributor for the pixel. As for the alpha layer, each pixel location is assigned an alpha value reflecting the proportion of the contribution of the majority color contributor. Finally, each pixel location of the noise layer is assigned a noise value reflecting the difference between a modeled color derived from alpha blending the main and secondary layer color values, and an observed color of the location.

The four-layer representation is generated using a statistical model. Once generated, this representation is used advantageously in a number of image editing operations. For example, image noise can be manipulated using the noise layer of the representation. In addition, various global pixel manipulating operations can be applied to the affected layer or layers while leaving the other layers intact. Another example of the advantageous use of the four-layer image representation involves a dynamic masking operation where a particular editing operation can be implemented on the fly as pixel locations are dynamically added to a masking area. In general, any image manipulation scheme that can make use of one or more of the image representation layers to change an image in a desired way, can be implemented.

It is noted that while the foregoing limitations in existing matting schemes described in the Background section can be resolved by a particular implementation of an image-wide matting technique according to the present invention, this is in no way limited to implementations that just solve any or all of the noted disadvantages. Rather, the present technique has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present image-wide matting technique, a brief, general description of a suitable computing environment in which portions thereof may be implemented will be described. The present image-wide matting technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
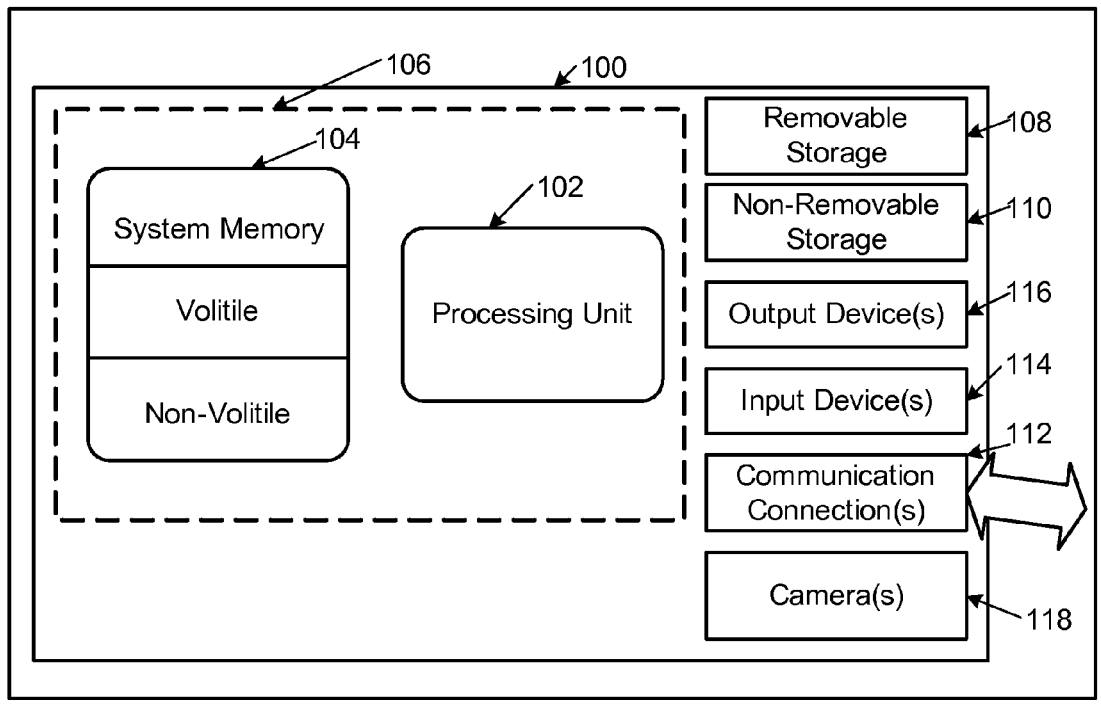
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present image-wide matting technique. Neither should the computing environment be interpreted as having any dependency or requirement relating to any one or combination of components illustrated in the exemplary operating environment. With reference to FIG. 1, an exemplary system for implementing the present image-wide matting technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present image-wide matting technique may be described in the general context of computer-executable instructions, such as program modules, being executed by a computing device. Generally, program modules include routines, programs, objects, components, data structures, etc. that perform particular tasks or implement particular abstract data types. The present image-wide matting technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present image-wide matting technique.

2.0 Image-Wide Matting

Figure 2:
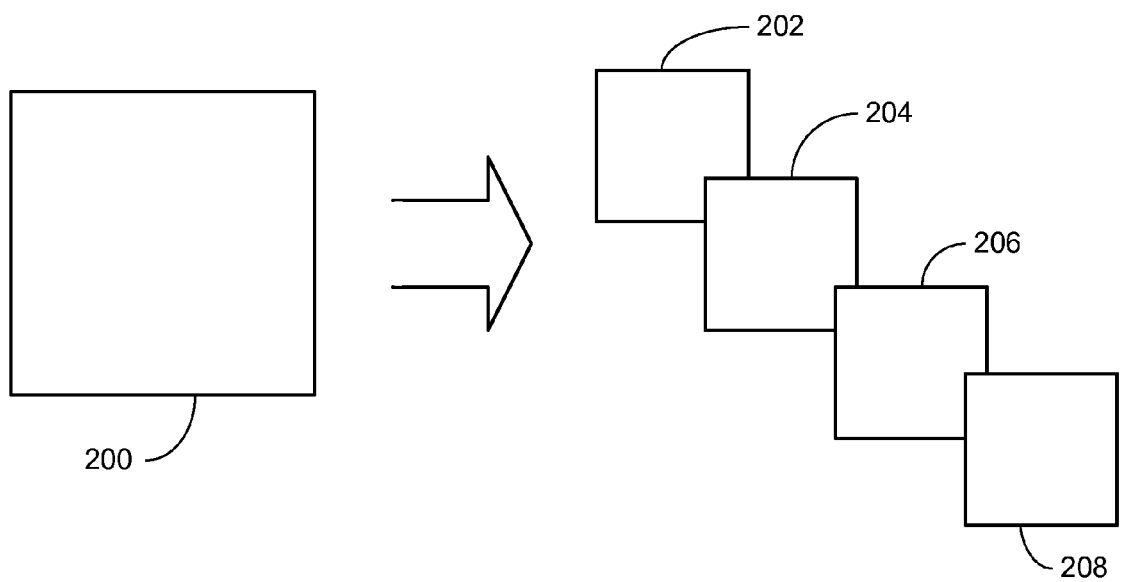
FIG. 2 is a block diagram illustrating the modeling of an image with a four layer representation.
Figure 3:
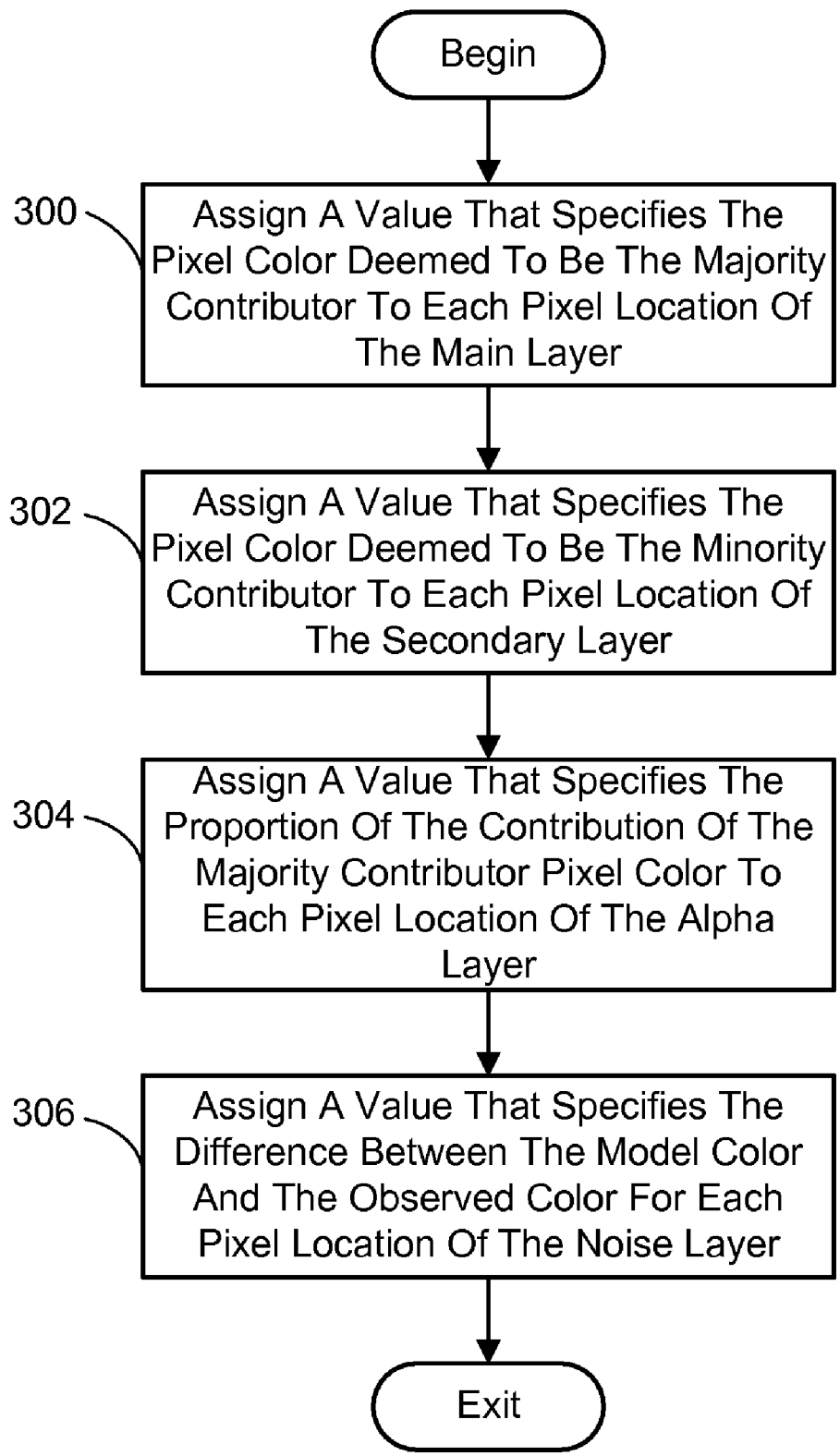
FIG. 3 is a flow diagram generally outlining one embodiment of a process for generating the present layered representation of an image.

The present image-wide matting technique generally involves preprocessing the image to find matting information for every pixel. Some of these pixels will contain contributions from more than one object, or will be partially shaded. To model the contributions to a pixel, a new image representation and statistical model is proposed. In one embodiment, shown in FIG. 2, the image representation involves modeling an image 200 using four layers: a main pixel color layer 202, a secondary pixel color layer 204, an alpha layer 206, and a noise layer 208. In general, these layers are generated as outlined in FIG. 3. Each pixel location of the main layer is assigned a value that specifies the pixel color deemed to be the majority contributor to the location (300), while each pixel location of the secondary layer is assigned a value that specifies the pixel color deemed to be a minority contributor to the location (302). Each pixel location of the alpha layer is assigned a value that specifies the proportion of the contribution of the majority contributor pixel color to the location (304). Note that this proportion will always exceed one-half. Contributions from the world (e.g., depicted objects, shadowing) are modeled by the alpha blended main and secondary colors. Each pixel location of the noise layer is assigned a value that specifies the difference between this world model and an observed color of pixel location in the image (306).

More particularly, the aforementioned statistical model is used to generate these four layers. Generally, this is accomplished using local color information instead of specified foreground and background objects. Thus, unlike previous methods which extract entire objects from the scene, the present technique extracts a set of colors along with their amount of contribution to each pixel. This approach offers several advantages. First, the matting information is useful for a larger variety of manipulations, including global image operations such as contrast enhancement and gamma correction. For instance, by applying contrast enhancement separately to each pixel's contributing color, the amount of contrast can be increased while maintaining image details and photorealism. Second, when manipulating a specific object, the pre-computed matting information can be used to dynamically create masks for the user. As a result, finding the mask and performing the operation can be unified from the user's perspective, with no explicit knowledge of the mask needed. These masks enable a variety of local operations, such as color replacement, dodge and burn, and blurring. The matting information also aids in extracting an estimate of the image noise, which can then be reduced by various methods.

In the sections to below, the new image representation and statistical model will be described first, followed by a description of various exemplary image editing techniques that can advantageously employ the representation.

2.1 The Four Layer Image Representation

To create the image representation, the image is decomposed into layers that describe the generation of the image. In doing this some assumptions are made. First, it is assumed each pixel receives contribution from at most two color regions. For the purposes of this description, a color region is defined as an area of consistent color belonging to one object. An object may have many color regions corresponding to areas with different reflection characteristics (i.e., albedo) or that are lit under different lighting conditions. Color regions corresponding to albedo changes can be quite small depending on the amount of local texture. For changes in lighting conditions, such as shadows, only the transition between these areas is modeled. No attempt is made to extract the contributions from multiple light sources over the entire object. It is noted that the two-color assumption may be violated for some pixels in the image, such as pixels at the intersection of three color regions, or in areas of significant blur. However, these cases are usually rare, and a pixel can typically be well modeled using just two colors.

It is also assumed that a pixel's color results from a combination of the objects' colors within its field of view, as well as noise and other non-linearities added by the camera. Thus, one purpose of the decomposition is to separate the contribution a pixel receives from the world, from sensor noise. Within the present model, it is also assumed that nonlinear effects such as vignetting, radial distortion, or a nonlinear camera response function are minimal or have been previously corrected.

Using these assumptions, one embodiment of the present image representation consists of four layers; a main pixel color layer, a secondary pixel color layer, an alpha layer and a noise layer, as mentioned previously. Whichever color that contributes more to a pixel is added to the main color layer, and the other color to the secondary color layer. The final predicted color contribution from the world for pixel x, $c^*_x$, is computed from the main color $m_x$, secondary color $s_x$ and alpha value $\alpha_x$ from the alpha layer by:

$$c^*_x = \alpha_x m_x + (1-\alpha_x) s_x \qquad (1)$$

The value of $\alpha_x$ always lies between 0.5 and 1, since by definition $m_x$ always contributes the majority of the pixel's color. The foregoing alpha-weighted sum of the main and secondary layer pixel colors is a matting equation, and thus generating the three layers above can be viewed as computing matting information over the entire image.

The noise layer contains the difference, or residual between the predicted world color $c^*_x$ and the observed color $c_x$. Thus, this layer contains any information that isn't represented by the present world model, such as camera noise. Accordingly, the final equation for the observed pixel color $c_x$ is:

$$c_x = \alpha_x m_x + (1-\alpha_x) s_x + n_x = c^*_x + n_x. \qquad (2)$$

2.2 Generating the Image Representation

The four layers of the aforementioned image representation are generated by maximizing the likelihood of a statistical model. More particularly, for each pixel x in an image, the goal is to find the most likely values for $m_x$, $s_x$, $\alpha_x$ and $n_x$ given the pixel's color $c_x$ and the colors $C_x$ of the pixels within a spatial neighborhood of x. In effect, a pixel's color is established based on its neighboring pixels. The likelihood computations are generally performed by computing the likelihood the main and secondary colors using the neighboring colors $C_x$ of pixel x. In addition, the likelihood of pixel x's alpha value $\alpha_x$ is computed, as is the likelihood of the noise $n_x$ being generated from a prescribed image noise model. Combining these three parts, the likelihood function is:

$$p(m_x, s_x, \alpha_x, n_x | c_x, C_x) = p(m_x | C_x) p(s_x | C_x) p(\alpha_x) p(n_x | c_x, m_x, s_x, \alpha_x) \qquad (3)$$

where $p(m_x, s_x, \alpha_x, n_x | c_x, C_x)$ is the overall probability, $p(m_x | C_x)$ is the main layer pixel color probability, $p(s_x | C_x)$ is the secondary layer pixel color probability, $p(\alpha_x)$ is the alpha layer value probability, and $p(n_x | c_x, m_x, s_x, \alpha_x)$ is the noise layer value probability. The process of maximizing Eq. (3) is done in two steps. First, the most likely main and secondary colors $m_x$ and $s_x$ are computed given the neighboring color values $C_x$. Second, given $m_x$ and $s_x$, the alpha value that maximizes $p(\alpha_x) p(n_x | c_x, m_x, s_x, \alpha_x)$ is determined. In doing this, the value of the noise $n_x$ is also determined. Each of the foregoing steps will be described in more detail in the sections to follow.

2.2.1 Establishing the Main and Secondary Color Layers

A pixel's main and secondary color values, $m_x$ and $s_x$, are found by using the color values $C_x$ of neighboring pixels. If it is assumed the world consists of small regions with constant color, pixels receiving contribution from a single region will form clusters of points within $C_x$. The colors which receive contribution from multiple regions will be scattered between the clusters.

Figure 4:
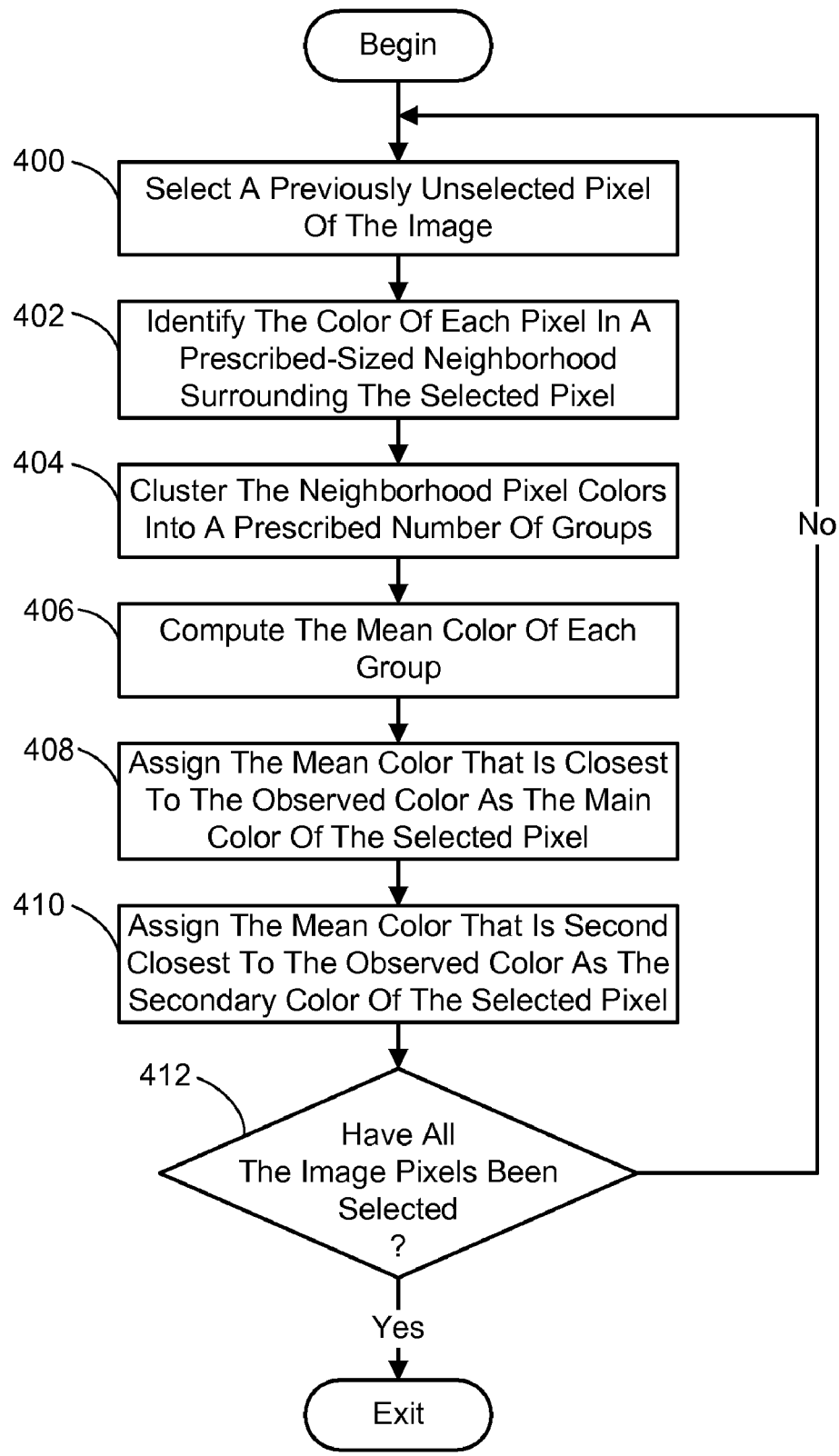
FIG. 4 is a flow diagram generally outlining one embodiment of a process for generating the main and secondary pixel color layers of the present layered representation of an image.

Referring to FIG. 4, one embodiment of a technique for computing each pixel's main and secondary colors, $m_x$ and $s_x$ is generally described. The technique begins by selecting a previously unselected pixel of the image being processed (400). The color of each pixel in a prescribed-sized neighborhood surrounding the selected pixel is then identified (402). It is noted that the size of the neighborhood will vary depending on the amount of noise and texture within an image. Greater amounts of noise and/or less texture would dictate a larger neighborhood. In tested embodiments, it was found that neighborhoods ranging in size from 3×3 to 9×9 windows around x produced satisfactory results, although other window sizes could be employed as warranted.

The neighborhood pixel colors are clustered into a prescribed number of groups (404) and the mean colors of each group are computed (406). Once the mean color values have been established for the selected pixel, the appropriate main and secondary colors $m_x$ and $s_x$ are assigned to that pixel. To determine the assignment of $m_x$ and $s_x$, it is assumed their values are equal to the mean colors. Thus, referring to FIG. 4 once again, it is next determined which mean color that is closest to the observed color of the selected pixel, and this mean color is assigned as the main color of the selected pixel (408). Likewise, it is determined which mean color is second closest to the observed color of the selected pixel, and that mean color is assigned as the secondary color of the selected pixel (410). It is next determined if all the image pixels have been selected (412). If not, actions 400 through 412 are repeated. When all the pixels have been assigned a main and secondary color, the technique ends. These assignments establish the main and secondary color layers of the image being processed.

The foregoing clustering of colors within $C_x$ can be done in a number of ways. In general, any clustering technique that can cluster pixels into two (or more) color groups can be employed. For example, a k-means clustering technique or principle component analysis (PCA) clustering technique can be used.

However, in tested embodiments, an Expectation Maximization (EM) technique was employed. This is a technique that establishes a prescribed number of color groups and identifies the pixels in the neighborhood that belong to each group. It is noted that this technique also establishes the probabilities that a pixel belongs to each of the groups. For example, if there were two groups, the results of the EM technique might establish that the probability of a pixel belonging to the first group is 0.9, while having just a 0.1 probability it belongs in the second group. In this example, the probability the pixel belongs to the first group represents the $p(m_x|C_x)$ term of Eq. (3) and the probability the pixel belongs to the second group represents the $p(s_x|C_x)$ term of Eq. (3).

In one implementation of the EM technique, the color clusters are modeled using a Gaussian mixture model (GMM). However, other distribution models could work as well—for example, a heavy-tailed Gaussian distribution. When a GMM is employed, each component $\Phi_i$ (i.e., color group i) within the model consists of a mean $a_i$ in color space with corresponding covariance matrix $\Sigma_{i,a}$. Thus, the likelihood of $m_x$ given $C_x$ is:

$$p(m_x | C_x) \propto \sum_i \mathcal{N}\left(m_x; a_i, \sum_{i,a}\right). \quad (4)$$

The value of $p(s_x|C_x)$ is similarly computed as:

$$p(s_x | C_x) \propto \sum_i \mathcal{N}\left(s_x; a_i, \sum_{i,a}\right). \quad (5)$$

$\mathcal{N}$ refers to a standard normal distribution in the foregoing equations.

It is noted, however, that if a two component GMM is employed and only color information is used, the results can be nebulous. For example, even if only one color mode exists, it is artificially split into two clusters. Further, mixed pixels that lie between the color modes contribute to the mean of the two components, thereby skewing the results. In addition, color outliers also contribute to the means, further skewing the results.

To address this issue, first it will be assumed that any variance of the colors within a cluster is due to image noise. Given this, the color variance $\Sigma_{i,a}$ can be made equal to the variance of the image noise $\sigma(a_i)^2$. As a result, if a single color mode exists within $C_x$, both components of the GMM will merge to have the same mean and extent. In addition, two new components can be added to the model to handle mixed colors and outliers. The first of these new components models mixed pixels that lie between the two color modes $\Phi_0$ and $\Phi_1$. For $c_i \in C_x$, the distribution of mixed pixels $\Psi$ is modeled as:

$$p(c_i|\Psi) = \kappa \, \mathcal{N}(c_i; \tilde{c}_i, \sigma(a_i)^2) \quad (6)$$

where $\tilde{c}_i$ corresponds to the point closest to $c_i$ on the line segment between the two mean colors $a_0$ and $a_1$ and $\sigma(a_i)^2$ is the image noise variance of $\tilde{c}_i$. $\kappa$ is a prescribed constant that has a value less than 1.0, and in tested embodiments was set to $\kappa=0.8$. The second new component is a uniform distribution $\Upsilon$ used to model outliers within $C_x$. The probability $p(c_i|\Upsilon)$ is set equal to some small prescribed constant O. For example, O was set to $10^{-6}$ in tested embodiments. Thus, the likelihood of $m_x$ given $C_x$ is now:

$$p(m_x | C_x) \propto \sum_i \mathcal{N}(m_x; a_i, \sigma(a_i)^2) + \kappa \mathcal{N}\left(c_i; \tilde{c}_i, \sum (\tilde{c}_i)\right) + O. \quad (7)$$

The value of $p(s_x|C_x)$ is now similarly computed as:

$$p(s_x | C_x) \propto \sum_i \mathcal{N}(s_x; a_i, \sigma(a_i)^2) + \kappa \mathcal{N}\left(c_i; \tilde{c}_i, \sum (\tilde{c}_i)\right) + O. \quad (8)$$

The foregoing can be thought of as using the EM technique to establish for each pixel, the probability that it belongs each of four groups—namely the first and second color modes $\Phi_0$ and $\Phi_1$, the mixed pixels group $\Psi$, and the outliers group (where the probability a pixel belongs to the outlier group is fixed at the aforementioned prescribed constant O). In this way, the mixed pixels and outliers do not skew the computation of the two mean colors as significantly.

It is noted that the mixed pixels probability and outlier probability need not both be added to the EM analysis. Rather one could be added and the other not, if desired.

It is further noted that the EM technique can be computationally expensive and must be computed for each pixel. To reduce the expense, in one implementation of the technique, the aforementioned k-means technique is used to establish initial values for the mean colors $a_0$ and $a_1$. The EM technique is then iteratively repeated until the mean color values converge (i.e., do not vary from one iteration to the next by more than a prescribed tolerance). At the beginning of each iteration, the mean color values are updated using the probability information computed in the last iteration. More particularly, the new mean $\bar{a}_i$ is computed as:

$$\bar{a}_i = \frac{\sum_j c_j p(c_j | a_i)}{\sum_j p(c_j | a_i)} \tag{9}$$

where $p(c_j|a_i)$ is computed in the last iteration for each pixel color in the neighborhood and j is the number of different pixel colors in the neighborhood. In the case where the k-means technique is used to initialize the mean color values, it was found in tested embodiments that four iterations of EM were sufficient to make the values converge.

Figure 5:
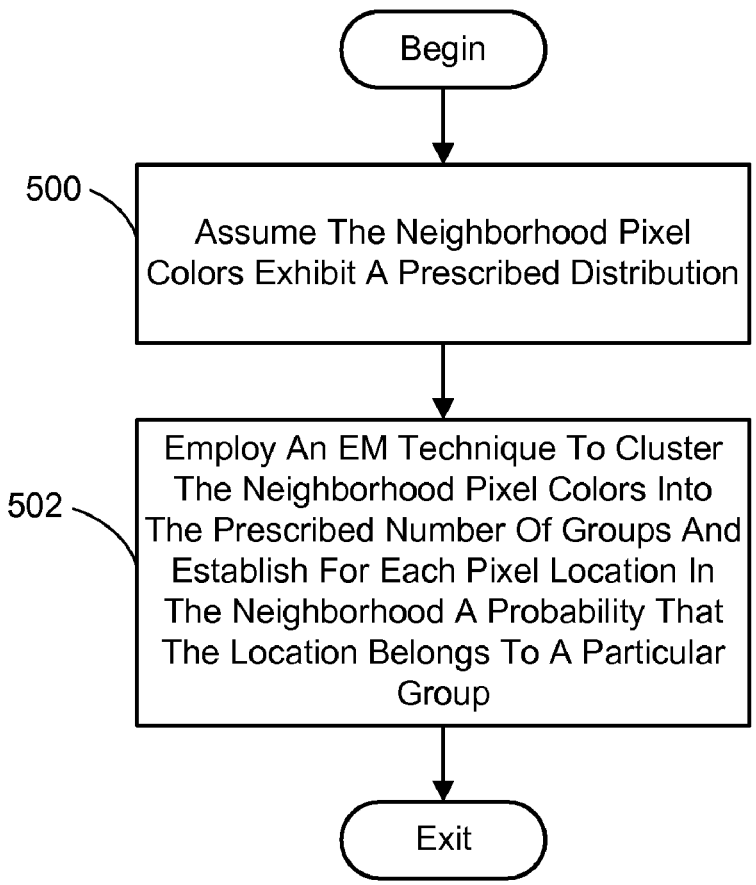
FIG. 5 is a flow diagram generally outlining one embodiment of a process for clustering pixel colors.

Given the foregoing, one embodiment of a technique for clustering the neighborhood pixel colors into a prescribed number of groups is generally outlined in FIG. 5. The number of groups can be set to just the main and secondary colors, or can include one or both of the mixed pixel color group and the outlier color group. The technique begins by assuming the colors of the neighborhood pixels have a prescribed distribution (500). For example, a Gaussian distribution such as the aforementioned GMM. Then, the EM technique is employed to group the neighborhood pixel colors into the prescribed number of groups and establish for each pixel location in the neighborhood a separate probability that the associated pixel color belongs to a particular group (502).

Figure 6:
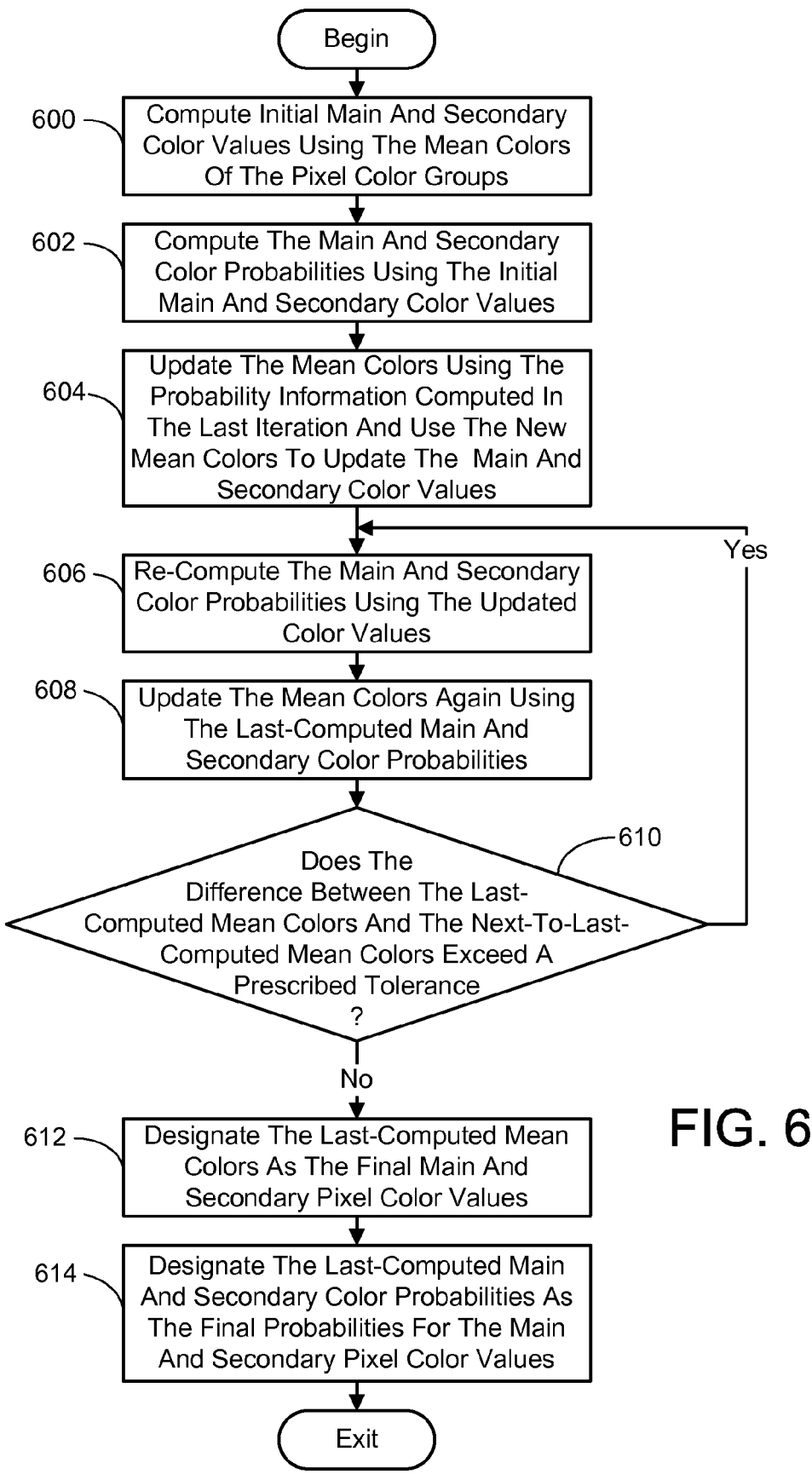
FIG. 6 is a flow diagram generally outlining one embodiment of a process for iteratively generating the main and secondary pixel color layers of the present layered representation of an image.

Referring now to the flow diagram in FIG. 6, one implementation of the EM technique would involve first computing initial main and secondary color values using the mean colors of the pixel color groups (600). This can be done using a k-means technique, as mentioned previously. The EM technique is then applied iteratively. This involves computing the main and secondary color probabilities using the initial main and secondary color values for the first iteration (602). In this example, the mixed color and outlier color groups are included, and so Eqs. 7 and 8 can be used to compute the probabilities. The mean colors used to compute the previous main and secondary color values are then updated using the probability information computed in the last iteration, and the main and secondary color values updated using the new mean colors (604). Equation (9) can be used for this purpose. The main and secondary color probabilities are then recomputed using updated color values (606). The mean colors are again updated using the newly computed probabilities (608), and it is determined if the difference between the updated mean colors and the mean colors employed in the next-to-last iteration exceeds a prescribed tolerance (610). If so, actions 606 through 610 are repeated. Whenever the difference between the updated mean colors and the mean colors employed in the next-to-last iteration does not exceed the prescribed tolerance, then the last computed mean colors are designated as the final main and secondary pixel color values for the pixel location under consideration (612). In addition, the last probabilities established are designated as the final probabilities for the main and secondary pixel color values (614).

2.2.2 Establishing the Alpha and Noise Layers

The probability $p(\alpha_x)$ associated with the alpha value $\alpha_x$ of each pixel x from Eq. (3) is used to bias pixels to receive contribution from only one color, i.e. $\alpha_x=1$. Mixed pixels only occur at color boundaries and are therefore less likely to occur. As a consequence, alpha values that are not equal to 1 are penalized:

$$p(\alpha_x) \propto \begin{cases} 1 & \alpha_x = 1 \\ \kappa & \text{otherwise} \end{cases} \tag{10}$$

Given this, the value for $\alpha_x$ that maximizes Eq. (3) is found. Since $p(\alpha_x)$ is not continuous, Eq. (3) cannot be solved directly. However, it is possible to evaluate Eq. (3) two times, once for $\alpha_x=1$ and once for $\alpha_x \neq 1$, and find the maximum. For the case where it is assumed $\alpha_x=1$, the value of $n_x$ is computed directly from the difference between the observed color $c_x$ and the predicted world color $c^*_x$:

$$n_x = c_x - c^*_x \tag{11}$$

Once $n_x$ is computed, $p(n_x|c_x, m_x, s_x, \alpha_x)$ is computed as the probability of $n_x$ given the camera's noise model. In many digital images, the amount of noise is highest for midrange values and decreases as the intensity becomes higher or lower. For the purposes of this description it is assumed the noise model for the camera is known, by either using a calibration grid, or from automatic methods. If $\sigma(c_x)^2$ is the variance predicted by the camera noise model for a color $c_x$:

$$p(n_x|c_x, m_x, s_x, \alpha_x) = \mathcal{N}(n_x; 0, \sigma(c_x)^2). \tag{12}$$

The color variance $\sigma(c_x)^2$ may be a full covariance matrix or a single scalar, depending on the complexity of the image noise model used.

At this point, $p(m_x|C_x)$, $p(s_x|C_x)$, $p(\alpha_x)$ and $p(n_x|c_x, m_x, s_x, \alpha_x)$ have been computed. It is noted that if the EM technique described above was not used for clustering, $p(m_x|C_x)$ and $p(s_x|C_x)$ for each pixel can be based on the number of points within $C_x$ close to $m_x$ and $s_x$ respectively. Eq. (3) can now be solved directly for pixel x to obtain a first candidate probability value for the case where $\alpha_x=1$.

In the case where it is assumed that $\alpha_x=1$, $p(\alpha_x)=\kappa$ as defined in Eq. 10. Thus, the alpha value (designated $\hat{\alpha}_x$) that will maximize $\kappa p(n_x|c_x, m_x, s_x, \alpha_x)$ needs to be found. The value that will maximize the foregoing probability is determined by finding the point that minimizes the distance between $c_x$ and a line segment from $m_x$ to $s_x$ using:

$$\hat{\alpha}_x = \frac{u \cdot v}{v \cdot v} \tag{13}$$

where $u=c_x-s_x$ and $v=m_x-s_x$. The resulting alpha value $\hat{\alpha}_x$ is designated as a candidate value as long as it lies between 0.5 and 1.

If $\hat{\alpha}_x$ is designated as a candidate value, it is used in Eq. (1) to compute a new value for $c^*_x$, which is in turn used to compute a new value for $n_x$. This new value of $n_x$ is then used in Eq. (12) to compute the probability $p(n_x|c_x, m_x, s_x, \alpha_x)$. Given this, we now have $p(m_x|C_x)$, $p(s_x|C_x)$, $p(\alpha_x)=\kappa$ and the new $p(n_x|c_x, m_x, s_x, \alpha_x)$. These are used to solve Eq. (3) for pixel x to obtain a second candidate probability value for the case where $\alpha_x \neq 1$.

Figure 7A:
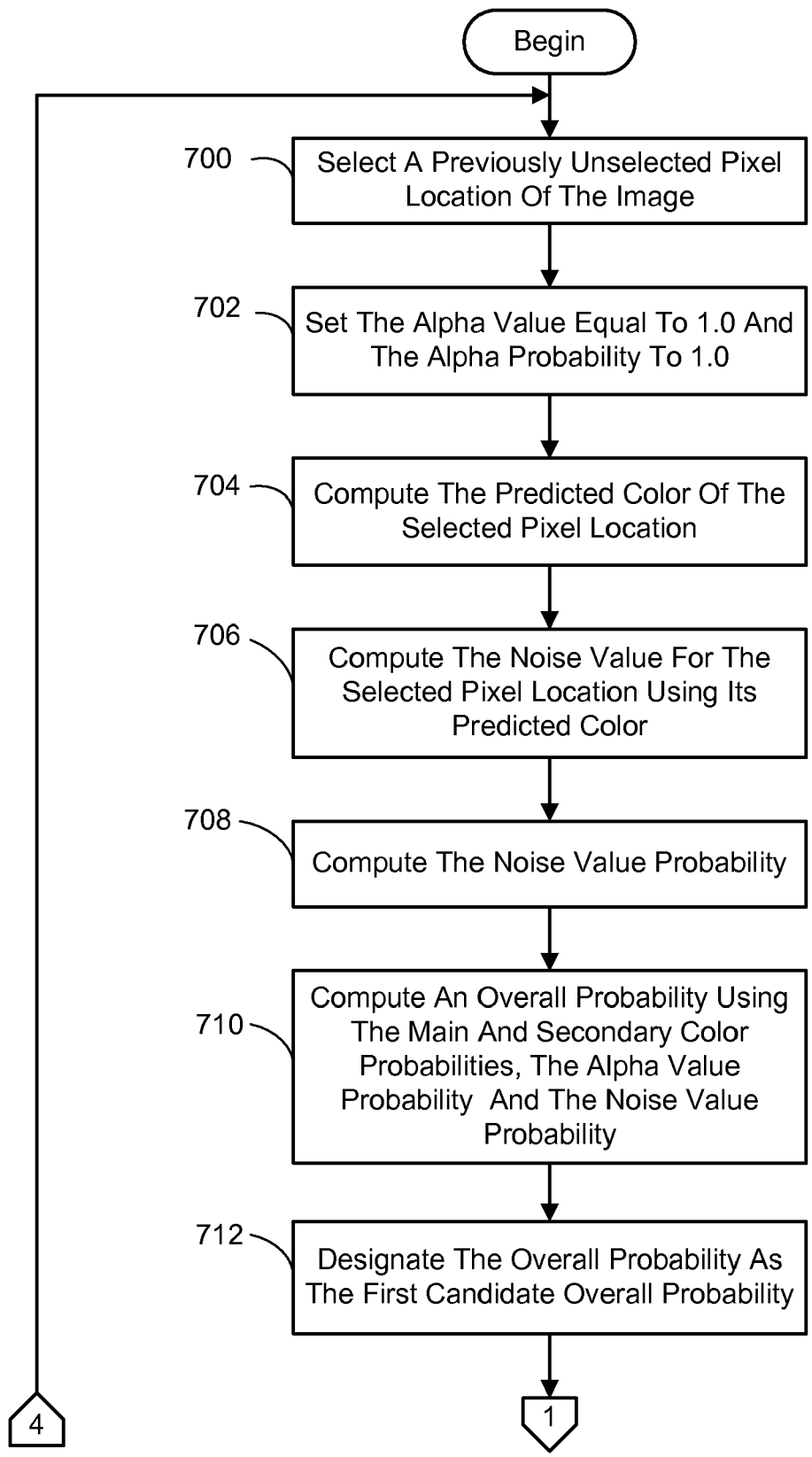
FIGS. 7A-C are a continuing flow diagram generally outlining one embodiment of a process for generating the alpha and noise layers of the present layered representation of an image.
Figure 7B:
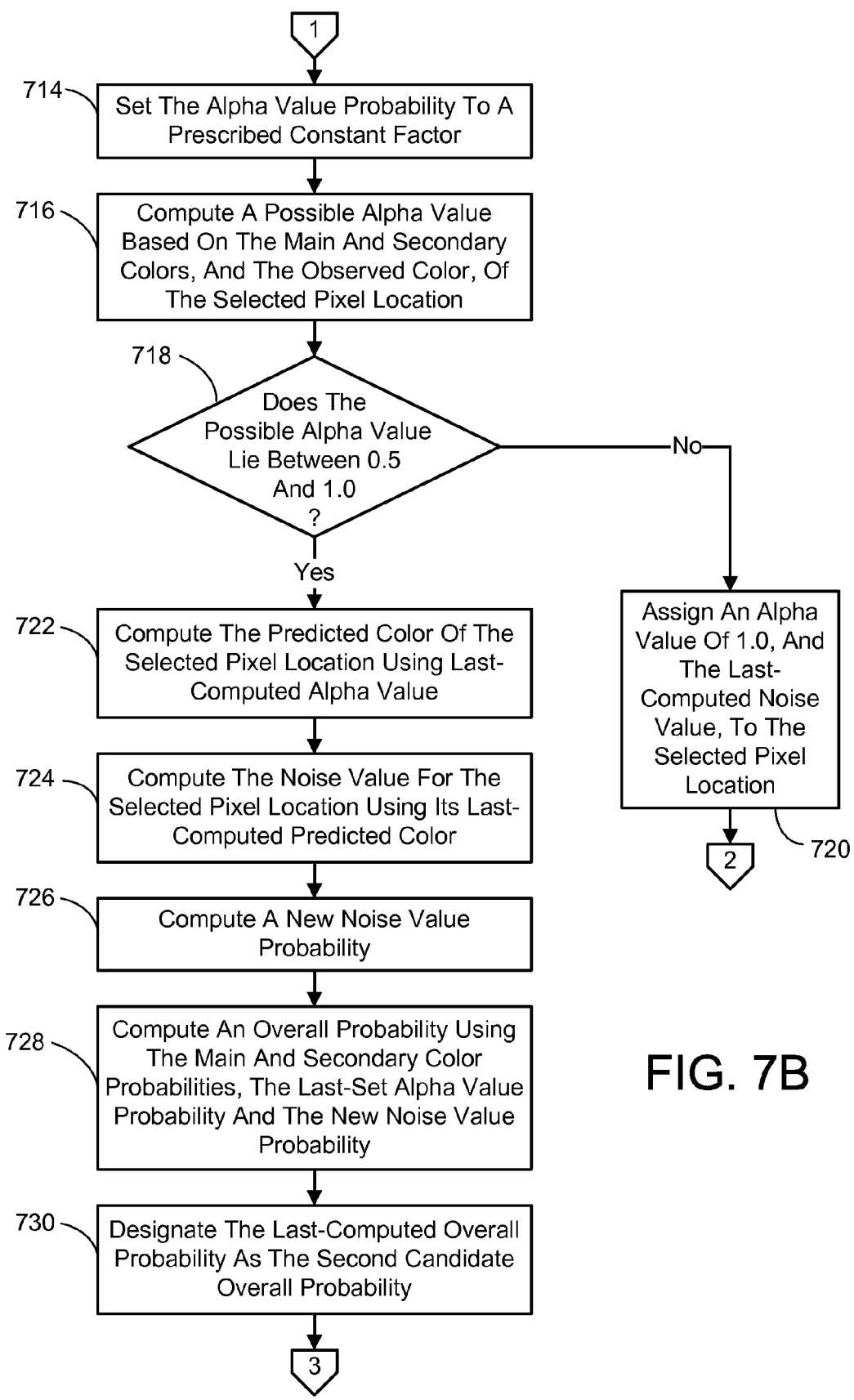
Figure 7C:
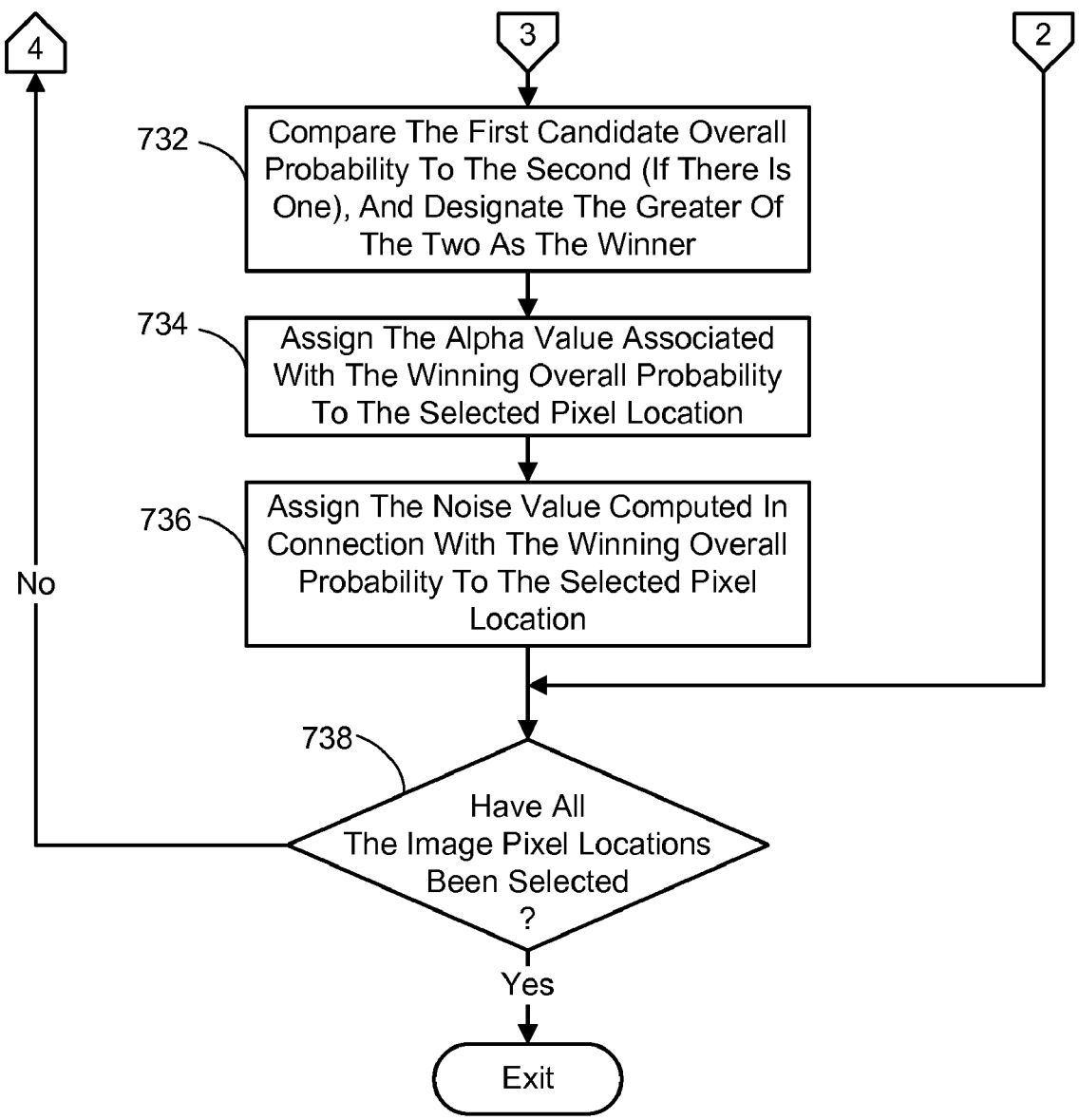

Given the foregoing, one embodiment of a technique for computing the alpha value $\alpha_x$ and noise value $n_x$ for each pixel location in the image being processed is generally outlined in FIGS. 7A-C. Referring to FIG. 7A, the technique begins by selecting a previously unselected pixel location of the image being processed (700). The main and secondary colors $m_x$ and $s_x$, observed color $c_x$, and probabilities $p(m_x|C_x)$ and $p(s_x|C_x)$ will be known at this point for the selected pixel location based on previous computations. The alpha value is first assumed to be equal to one, i.e., $\alpha_x=1$, for the selected pixel location, and so by Eq. 10, $p(\alpha_x)$ is also assumed to be one (702). The predicted color $c^*_x$ of the selected pixel location is then computed (704) and the result is used to compute the noise value $n_x$ for the selected pixel location (706). This can be accomplished using Eqs. (1) and (11), respectively. Next, the probability of the just computed noise value is computed (708). This can be done, for example, using Eq. 12 where a normal distribution of noise values is assumed with the mean value being 0 and the variance $\sigma(c_x)^2$ being dictated by the prescribed noise model and the observed color $c_x$ of the selected pixel location. Thus, the probability of the noise value $p(n_x|c_x, m_x, s_x, \alpha_x)$ can be determined by finding where on the normal distribution curve the value falls using conventional methods. The overall probability is then computed (710) using the main and secondary color probabilities, $p(m_x|C_x)$ and $p(s_x|C_x)$, the assumed alpha value probability $p(\alpha_x)$ and the just computed noise value probability $p(n_x|c_x, m_x, s_x, \alpha_x)$. This can be accomplished, for example, using Eq. (3). The resulting value is designated as the first candidate overall probability based on the assumption that the alpha value is one (712).

The overall probability is also computed based on the assumption that the alpha value does not equal one. This can be done in parallel with computing the overall probability where the alpha value is assumed to be one, or serially after that calculation. For convenience, the serial case will be shown in the example technique of FIGS. 7A-C. Thus, referring now to FIG. 7B, it is next assumed that the alpha value of the selected pixel location does not equal one, $\alpha_x=1$, and so by Eq. 10, the probability of the alpha value $p(\alpha_x)$ is assumed to be the constant $\kappa$ (714). Given this, a possible alpha value $\hat{\alpha}_x$ is computed based on the main and secondary colors $m_x$ and $s_x$ and observed color $c_x$ for the selected pixel location (716). One way of accomplishing this is using Eq. (13). It is then determined if the possible alpha value $\hat{\alpha}_x$ lies between 0.5 and 1.0 (718). If not, an alpha value of one is assigned to the selected pixel location, and the noise value $n_x$ previously computed assuming the alpha value was one is assigned to the selected pixel location (720). The technique then continues with action (738). If, however, the possible alpha value $\hat{\alpha}_x$ falls within the aforementioned range, the predicted color $c^*_x$ of the selected pixel location is computed using the just computed possible alpha value $\hat{\alpha}_x$ (722) and the result is used to compute a new noise value $n_x$ for the selected pixel location (724). Here again, this can be accomplished using Eqs. (1) and (11), respectively. Next, the probability of the new noise value is computed (726). This can be done, for example, using Eq. 12 in the manner described previously. The overall probability is then computed (728) using the main and secondary color probabilities, $p(m_x|C_x)$ and $p(s_x|C_x)$, the assumed alpha value probability $p(\alpha_x)=\kappa$ and the new noise value probability $p(n_x|c_x, m_x, s_x, \alpha_x)$. This can once again be accomplished using Eq. (3). The resulting value is designated as the second candidate overall probability (730), this time based on the assumption that the alpha value is possible alpha value $\hat{\alpha}_x$.

Next, referring now to FIG. 7C, the first candidate overall probability is compared to the second candidate overall probability value (if there is one), and the greater of the two is designated as the winner (732). The alpha value (i.e., either 1 or $\hat{\alpha}_x$) associated with the winning overall probability value is then assigned to the selected pixel location (734). In addition, the noise value $n_x$ computed in connection with the winning probability value is assigned to the selected pixel location (736). It is then determined if all the pixel location of the image being processed have been selected and processed (738). If not, actions (700) through (738) are repeated. Otherwise the technique ends. The alpha values assigned to the pixel locations of the image form the alpha layer and the noise values form the noise layer.

2.2.3 Refining the Main and Secondary Colors

In the description so far, it has been assumed a pixel's color was the combination of colors within $C_x$. However, the true unmixed color for a pixel x may not exist in $C_x$. This might happen if the size of the window used to find $C_x$ is too small. One option for solving this problem is to use a larger window for $C_x$, although this may add too many outlying colors. Another option would be to iteratively update the colors within $C_x$ using the previous estimates of $m_x$ and $s_x$ for these pixels.

If the latter option is chosen, the colors within $C_x$ are initially sampled from the original image and the foregoing technique for generating the image representation is completed to produce an initial estimate of the representation. After the initial estimation, a refined estimate would be iteratively computed using the foregoing technique. However, the predicted color $c^*_x$ of each pixel x, as computed from Eq. (1) based on the main and secondary colors $m_x$, $s_x$ and alpha value $\alpha_x$ from the previous iteration, would act as the observed color in subsequent iterations, rather than being sampled from the original image.

Figure 8:
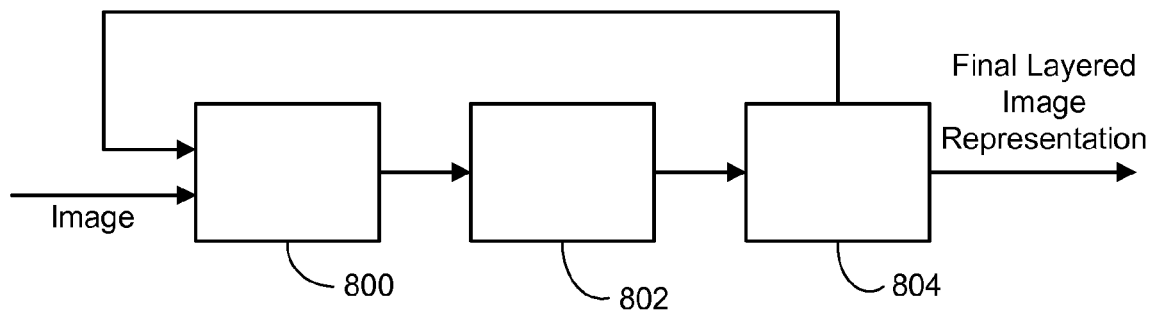
FIG. 8 is a block diagram showing one embodiment of the program modules used to iteratively refine the main and secondary pixel color layers, alpha layer and noise layer of the present layered representation of an image.

The modules for iteratively refining the layer estimates according to one embodiment of the present technique are shown in FIG. 8. In general terms the image is input into a color layer generation module, which generates the main and secondary color layers. This layer data is then provided to an alpha and noise layer generation module 802, which generates the alpha and noise layers. The layer data is then provided to a color convergence module 804. This module 804 first determines if the predicted pixel color for any pixel location computed using the last generated main, secondary and alpha layers deviates from the observed color of the pixel location for the first iteration, or from the last previous predicted pixel color for subsequent iterations, by more than a prescribed tolerance. If any pixel location deviates by more than the prescribed tolerance, the color convergence module 804 causes new main, secondary, alpha and noise layers to be generated from the color layer generation module and the alpha and noise layer generation module using the predicted pixel color computed using the last generated layers. However, if none of the pixel locations deviates by more than the prescribed tolerance (i.e., the colors have converged), then the color convergence module 804 designates the last generated layers as the final layered representation of the image.

In a variation of the foregoing iterative refinement embodiment, the noise layer can also be added onto both the main and secondary colors to maintain consistency with the original image colors prior to computing the aforementioned proposed color for each pixel location. Thus, for pixel x' in the neighborhood of x at iteration t, the main color used in the refining procedure is $m_{x'}^{t-1}+n_{x'}^{t-1}$ and the secondary color is $s_{x'}^{t-1}+n_{x'}^{t-1}$. In addition, when computing $\Phi_0$ and $\Phi_1$ the noise modified colors are also weighted by $\alpha_x^{t-1}$ and $1-\alpha_x^{t-1}$ respectively.

2.3 Image Manipulation

Figure 9:
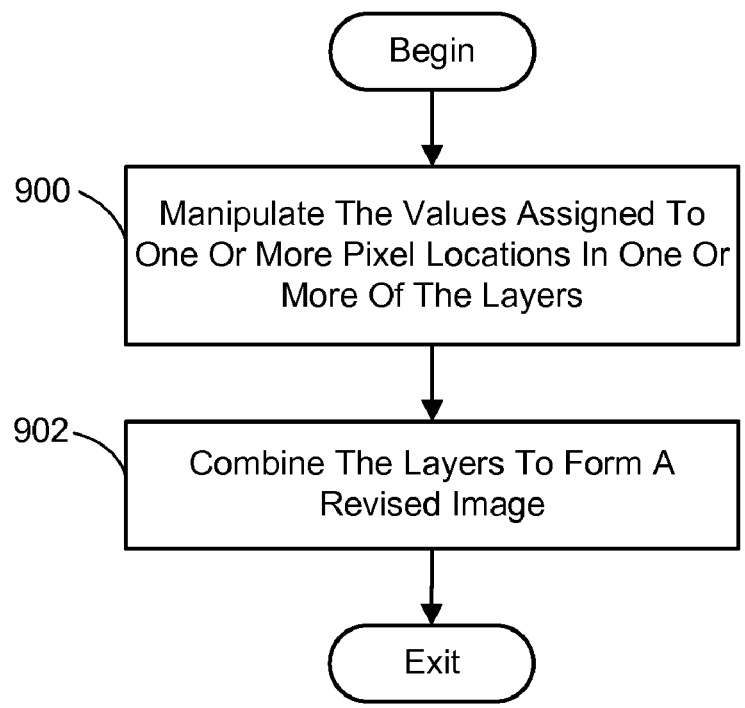
FIG. 9 is a flow diagram generally outlining one embodiment of a process for manipulating an image using the present layered representation of the image.

The foregoing four-layer image representation can be employed to effect many advantageous changes in an image. Referring to FIG. 9, this is in general accomplished by individually manipulating the values assigned to one or more pixel locations in one or more of the layers representing the image to effect a change (900). The layers are then combined to form a revised image (902). The combining is done using Eq. (2) where the alpha weighted sum of the main and secondary layer values are added to the noise value associated with each pixel location of the image.

In the following sections three classes of image manipulations that take advantage of the four-layer image representation will be described—namely noise layer manipulation, global operations, and local operations using dynamic masks. However, it is not intended to imply that the four-layer image representation can only be used for these image manipulations. Rather, as stated previously, any image manipulation scheme that makes use of the main or secondary pixel color values, or alpha values, or pixel noise values, or any combination thereof, can advantageously employ the present image representation.

2.3.1 Noise Layer Manipulation

The noise layer of the image representation contains information not represented by the other layers, such as camera noise. This layer also includes image details that are not properly modeled by the previously-described two color model, such as highly textured areas with multiple colors and small highlights that are not accounted for by either color. This noise layer information can be separated into three separate components—namely illumination noise, chrominance noise and outliers. Modeling image noise in this way has several advantages.

For example, the total amount of noise in the final image can be controlled by scaling the magnitudes of the noise components of one or more pixel locations. This can be done uniformly across all three noise components, or each noise component can be controlled separately. By adjusting the contribution of each noise component either uniformly or individually, the user has a large amount of control over the type and amount of noise present in an image.

Figure 10:
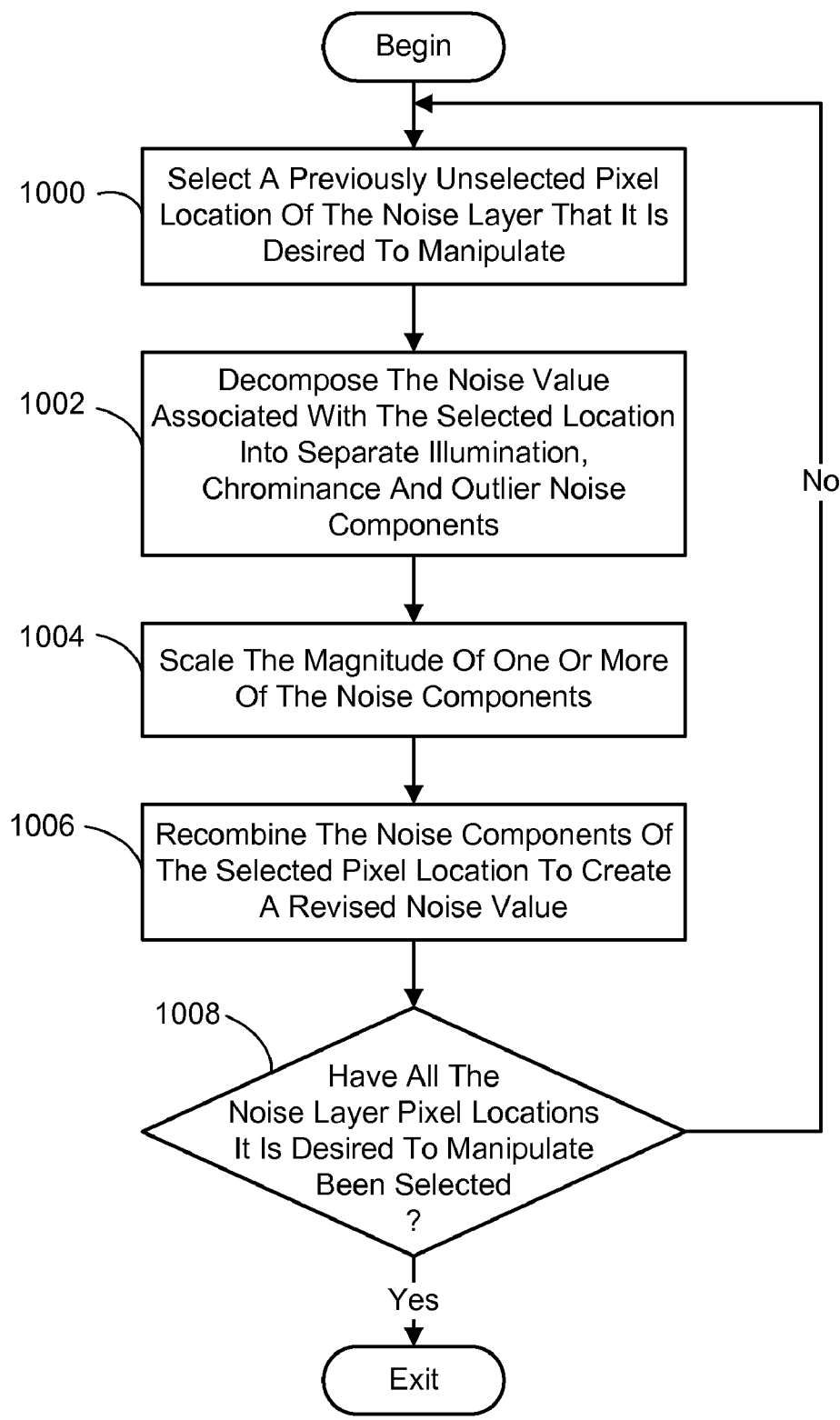
FIG. 10 is a flow diagram generally outlining one embodiment of a process for manipulating image noise using the noise layer of the present layered representation of an image.

Given this, one embodiment of a technique for manipulating the noise layer to ultimately effect changes in a reconstructed image is generally outlined in FIG. 10. The technique begins by selecting a previously unselected pixel location of the noise layer that it is desired to manipulate (1000). The noise value associated with the selected location is then decomposed into separate components representing an illumination noise component, a chrominance noise component and an outlier noise component (1002). The magnitude of one or more of the components is scaled as desired (1004). The scaling is done by independently increasing or decreasing the magnitude of the components, including making no change or completely zeroing out a component. The noise components of the selected pixel location are then recombined to create a revised noise value for the selected noise layer pixel location (1006). It is next determined if all the pixel locations of the noise layer that it is desired to manipulate have been selected (1008). If not, actions 1000 through 1008 are repeated. When all the desired pixel locations have been selected and processed, the technique comes to an end.

Some examples of the noise layer manipulations include the following. For instance, the illumination and chrominance noise may be effectively removed from an image, with results similar to those of a bi-lateral filter without the edge sharpening artifacts. Alternately, the chrominance noise can be removed, while a small amount of illumination noise is retained. This can result in the image appearing more natural, as if it was captured on film. The noise components can also be manipulated in certain areas rather than across the entire image. For example, the noise levels can be reduced in areas where the pixels exhibit fractional alpha values, since some of the image noise may be caused by alpha blending. In addition, the noise may be increased at intensity peaks to compensate for the slight blurring that may occur when computing $m_x$ and $s_x$. Further, the outlier noise components will exhibit high values wherever the main and secondary colors do not model the observed color well. This can occur for many reasons, including ringing caused by JPEG artifacts, or as indicated previously, due to small details such as highlights. Given this, the user may want to fully retain the outlier noise. Still further, while the chrominance noise typically has a uniform variance, it can exhibit peaks in areas with demosaicing artifacts, as well as areas with high color variation. Given this, reducing the color noise might reduce these artifacts, but it will result in a slightly de-saturated image.

In one embodiment of the present technique, the noise layer information is separated into the aforementioned three separate components as follows. First, to compute the illumination noise and outliers, the intensity $n_x^i$ of the noise layer value $n_x$ for a pixel x is computed as:

$$n_x^i = (n_x^r + n_x^g + n_x^b)/3, \quad (14)$$

where $n_x^r$, $n_x^g$ and $n_x^b$ are the RGB color components of $n_x$. The chrominance noise $n_x^c$ is modeled as the difference between $n_x^i$ and $n_x$. Thus:

$$n_x^c = \{n_x^r - n_x^i, n_x^g - n_x^i, n_x^b - n_x^i\}. \quad (15)$$

The illumination noise $n_x^w$ is used to model values for $n_x^i$ that fit within the image noise model $\sigma(c_x)$, while the outlier value $n_x^o$ models larger vales for $n_x^i$. The value $n_x^i$ is split between $n_x^w$ and $n_x^o$ using:

$$n_x^w = \beta_x n_x^i \text{ and } n_x^o = (1-\beta_x) n_x^i, \quad (16)$$

where $\beta_x \in [0,1]$. The value $\beta_x$ computed as:

$$\beta_x = \frac{1}{Z} \mathcal{N}(n_x^i; 0, \sigma(c_x)) \quad (17)$$

where Z is the normalization constant associated with the normal distribution $\mathcal{N}$, i.e., $Z = \mathcal{N}(0; 0, \sigma(c_x))$.

2.3.2 Global Operations

Global image operations, such as contrast adjustment, gamma correction, or color curve manipulation, are used to increase tonal range, bring out details and simulate more dramatic lighting effects. For example, consider a scene lit by an ambient light source and a directional light source, as is common in outdoor scenes. An increase in contrast will darken the portion of the scene lit by the ambient light source and brighten that of the directional light source, e.g., direct sunlight. This effect creates a more dramatic photograph with higher definition.

With standard approaches to adjusting contrast, there is a limit to the range of possible values in which photorealism can be maintained. In general, as the contrast is increased, some edges in the image are sharpened, while others are lost. These artifacts occur because the contrast adjustment, g, is applied directly to each pixel's color $c_x$ to produce the enhanced color $c'_x$. Thus, $$c'_x = g(c_x). \quad (18)$$

However, Eq. (18) implicitly makes the assumption that each pixel receives contribution from a single source. As described previously, pixels may receive contribution from multiple sources. To help in maintaining photorealism when applying increasing amounts of contrast to an image, the contrast adjustment can be applied to each pixel's source separately and weighted according to the pixel's alpha value. Because the pixel sources and noise are modeled by separate layers in the present image representation, applying contrast adjustment to each pixel's source separately has the added advantage of allowing for the manipulation of an image's contrast without affecting the noise. For example, the contrast of an image can be increased without also increasing the noise, as would be the case if the contrast adjustment where applied to the observed color of each pixel. In the previously-described case of a two-color contribution model, Eq. (18) would be modified as follows to achieve the foregoing effect:

$$c'_x = \alpha_x g(m_x) + (1-\alpha_x) g(s_x) + n_x. \quad (19)$$

It is noted that similar results are achieved for any other image manipulation functions, such as the aforementioned gamma correction, brightness, or color curve manipulation. The particular function of interest is simply substituted for g in Eq. (19), or as will be seen next in Eq. (20).

Figure 11:
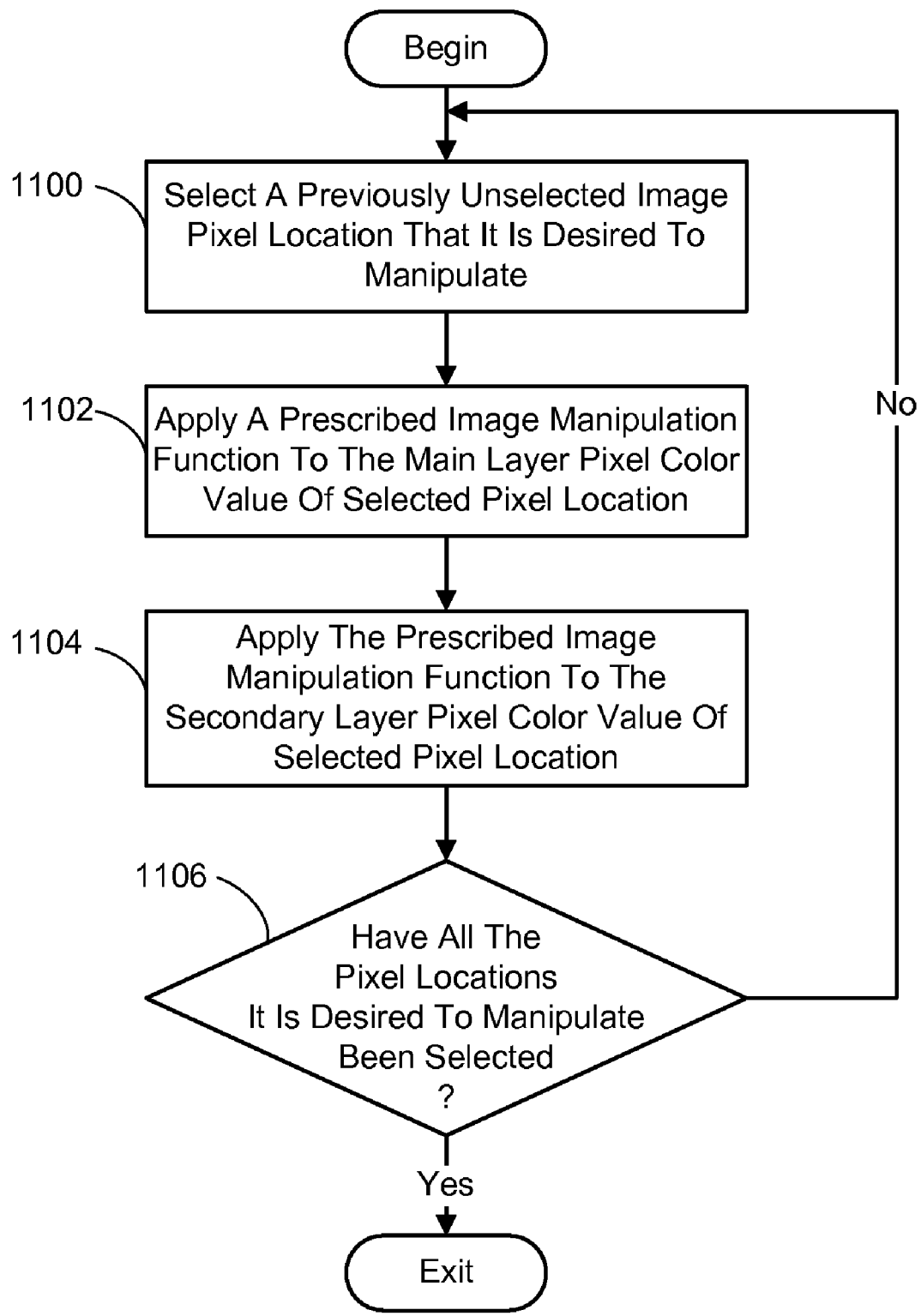
FIG. 11 is a flow diagram generally outlining one embodiment of a process for manipulating an image by applying an image manipulation function to individual layers of the present layered representation of an image.

Given this, one embodiment of a technique for applying an image manipulation function using the present four-layer image representation is generally outlined in FIG. 11. The technique begins by selecting a previously unselected pixel location of the image that it is desired to manipulate (1100). A prescribed image manipulation function is then applied to the main layer pixel color value assigned to the selected pixel location (1102). Similarly, the prescribed image manipulation function is applied to the secondary layer pixel color value assigned to the selected pixel location (1104). It is then determined if all the desired pixel locations have been selected (1106). If not, actions 1100 through 1106 are repeated. When all the desired locations have been selected and processed, the technique comes to an end.

The revised main and secondary layer pixel color values are used when the layers are recombined to generate a modified image. This can be done using Eq. (2), which includes adding the noise back into the image. Overall this involves implementing Eq. (19) and results in softer transitions and a preservation of image details.

Separating the noise from the contrast adjustment also allows the noise layer to be manipulated separately. For example, as described previously, the noise could be independently increased or decrease in total, or the individual noise components could be manipulated separately. This has particular advantage for noise models that vary with intensity. For instance, the variance of the noise may be adjusted to agree with the original image noise model, based on any intensity change caused by the contrast adjustment.

In an alternate version of the present global manipulation technique, Eq. (19) is again modified, this time to add a noise component to the color sources. This is done because in some instances it may be desired to scale one or more of the aforementioned noise components along with the color sources. To accomplish this the particular noise component or components have to be added to each color source before applying the global adjustment factor. For example, depending on how many image details are contained in the outlier layer $n°_x$, it may in some cases be desirable to add $n°_x$ onto $m_x$ and $s_x$ before applying g. In such a case Eq. (19) would be modified as follows:

$$c'_x = \alpha_x g(m_x + n°_x) + (1-\alpha_x) g(s_x + n°_x) + (n_x - n°_x). \quad (20)$$

This can be accomplished by decomposing the noise layer as described previously in connection with FIG. 10, and adding the outlier noise component of each pixel location to the main and secondary layer pixel color values associated with that location, prior to applying the image manipulation function in the manner described in connection with FIG. 11. In addition, the outlier noise component is excluded when recombining the noise components to reconstruct the noise layer value.

2.3.3 Local Operations Using Dynamic Masks

The task of performing local image operations is traditionally broken into two parts: Defining the area, called a mask, where the operation is to be performed, followed by performing the operation within the specified area. The decoupling of finding the mask and performing the operation is necessary since the actions required for finding a mask, such as marking mask boundaries, drawing bounding boxes, or marking inside and outside regions, differs from that of the manipulation.

When creating a mask, matting information is needed in finding boundaries if high quality results are to be achieved. The matting information is traditionally derived around the mask's boundaries after the extent of the mask has been established. Often, it is a user that specifies the extent of the mask in the image. This is usually done by the user dragging a virtual "brush" in a painting or drawing motion around the general area in an image in which the mask is to be created. The user also specifies a brush or drawing radius r to specify the boundaries of the operation, and typically specifies the color indicative of the pixels that belong to the desired mask area. The user usually performs this latter task by selecting a pixel within the area to be masked. There are many well known commercial programs available that allow a user to perform the foregoing tasks, accordingly no further details will be provided herein.

In the context of the present image editing techniques, it is noted that the four layer image representation already provides matting information computed across the entire image. As a result, this information can be incorporated directly into finding the mask's extent. That is, each color component of the pixel can be treated separately for membership in the mask. As a result, finding the mask and performing whatever editing operation within the masked area are unified from the user's perspective, and no explicit knowledge of the mask is needed.

Figure 12:
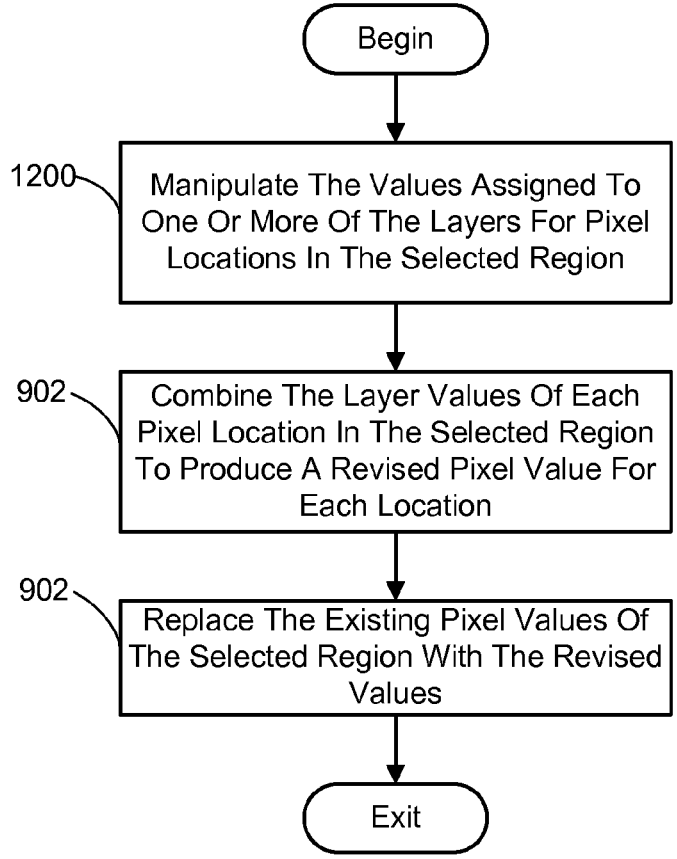
FIG. 12 is a flow diagram generally outlining one embodiment of a process for manipulating a particular region of an image using the present layered image representation.

As the dynamic mask operation involves manipulating a particular region of an image, the general image editing technique described in connection with FIG. 9 is modified somewhat to accommodate the local nature of the operation. This is in accomplished as generally outlined in FIG. 12. First, the values assigned to one or more of the layers for pixel locations in a selected region are manipulated to effect a desired change (1200). The layer values of each pixel location in the selected region are then combined to produce a revised pixel value for each location in the selected region (1202). The combining is done using Eq. (2) where the alpha weighted sum of the main and secondary layer values are added to the noise value associated with each pixel location of the selected region. The existing pixel values of each pixel location in the selected region are then replaced with the revised pixel values (1204).

Figure 13A:
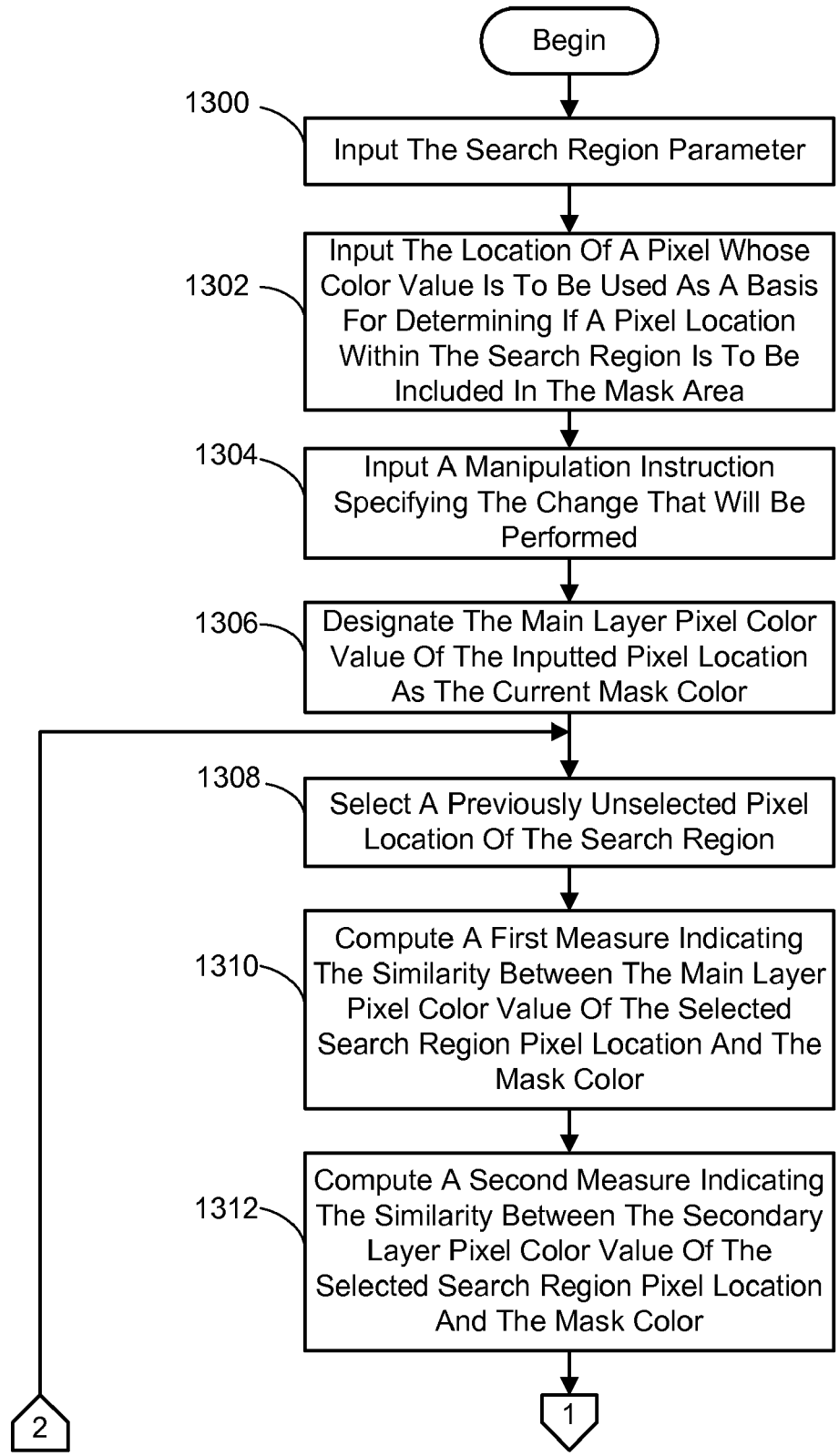
FIGS. 13A-B are a continuing flow diagram generally outlining one embodiment of a process for manipulating an image by performing a dynamic masking operation using matting information provided by the present layered representation of an image.
Figure 13B:
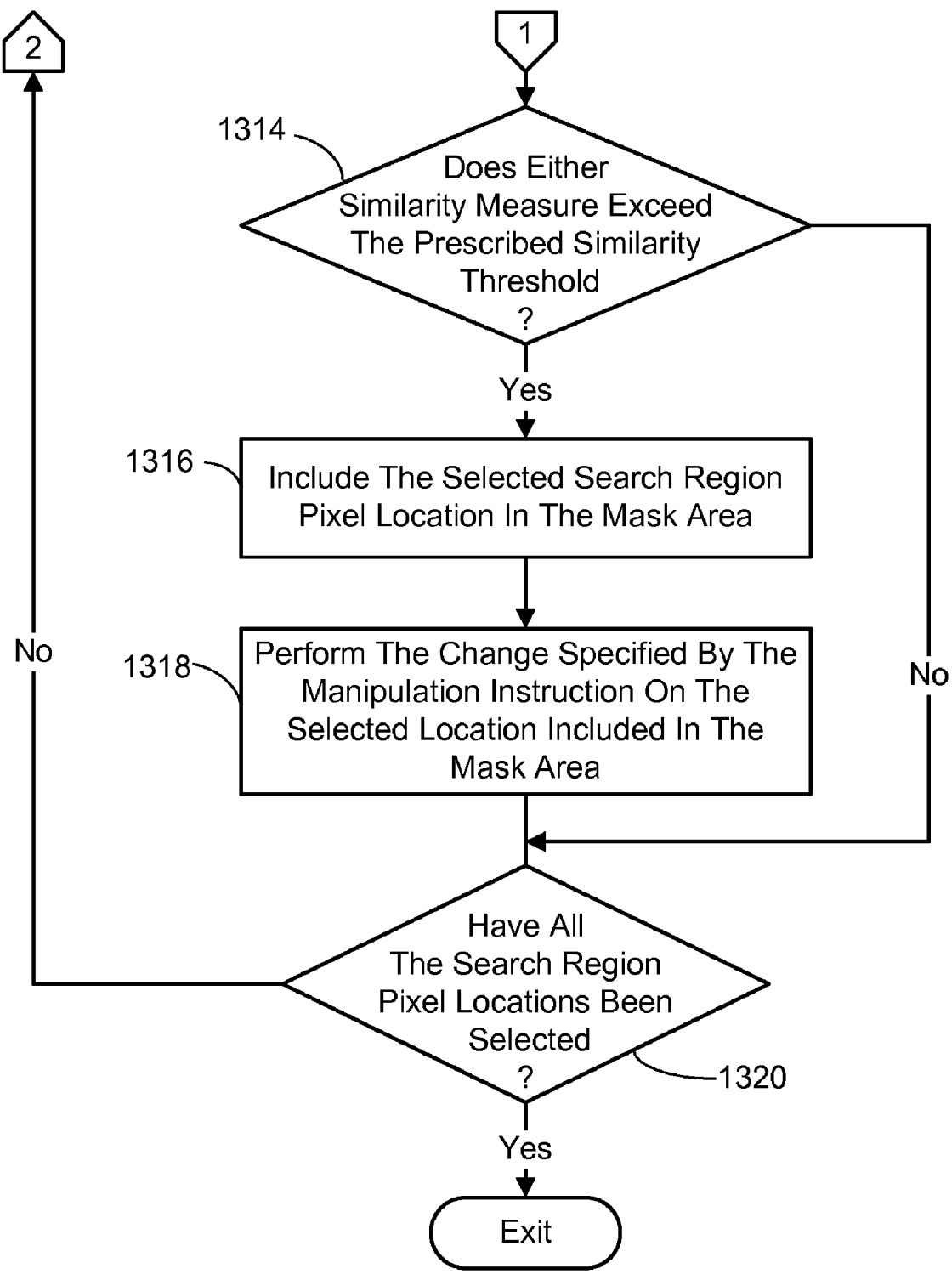

One embodiment of a technique for implementing the aforementioned dynamic mask operation is generally outlined in FIGS. 13A-B. The process begins by inputting a series of parameters. As indicted above, these can be user-specified parameters. More particularly, a parameter defining a search region is input (1300). The search region extends out from a currently selected pixel location of the image. This can be the current pixel location along the aforementioned drawing motion path. All the pixel locations, or parts thereof, that fall within the search region will be considered for inclusion in the mask area. The location of a pixel whose color value is to be used as a basis for determining if a pixel location within the search region is to be included in the mask area, is input as well (1302). Finally, a manipulation instruction specifying the change that will be performed is input (1304). More particularly, the instruction specifies the change that will be performed on the pixel value or values of one or more of the layers associated with pixel locations included in the mask area.

Given the inputted parameters, the technique continues by designating the main layer pixel color value of the aforementioned inputted pixel location as the current mask color (1306). A previously unselected pixel location of the search region is then selected (1308). A first similarity measure is computed which indicates the degree of similarity between the main layer pixel color value of the selected search region pixel location and the mask color (1310). Similarly, a second similarity measure is computed which indicates the degree of similarity between the secondary layer pixel color value of the selected search region pixel location and the mask color (1312). It is then determined if either of the foregoing similarity measures exceed a prescribed similarity threshold (1314). If either of the measures does exceed the threshold, then the selected search region pixel location is included in the mask area (1316). The change specified by the previously inputted manipulation instruction is then performed on the pixel value or values associated with the one or more layers involved in the change for the selected location included in the mask area (1318). Once the change has been performed, or if it was previously determined that neither of the similarity measures exceeds the similarity threshold, it is determined if all the search region pixel locations have been selected (1320). If not, actions 1308 through 1320 are repeated. When all the search region pixel locations have been selected and processed, the technique comes to an end.

In regard to the foregoing general actions of computing the similarity measures and determining if a pixel location is to be included in the mask area, in one version of the technique the following procedure can be employed. Specifically, if $\delta_{m_x}$ and $\delta_{s_x}$ are the portion of the main and secondary colors for pixel x within the drawing radius of the virtual brush, the total contribution $\delta_x$ for the pixel x is $\delta_x = \alpha_x \delta_{m_x} + (1-\alpha_x)\delta_{s_x}$. The values for $\delta_{m_x}$ and $\delta_{s_x}$ can be computed using an iterative region growing method as follows. The main layer color value for the pixel $x_c$, which is the color of the pixel specified by the user as indicative of the pixels that belong to the desired mask area, is added to the mask, $$\delta^t_{m_x} = S(m_x, c_m)\min\left(1, \frac{\delta^{t-1}_{x,\max}}{\alpha_x S(m_x, c_m) + (1-\alpha_x)S(s_x, c_m)}\right) \quad (23)$$

and $$\delta^t_{s_x} = S(s_x, c_m)\min\left(1, \frac{\delta^{t-1}_{x,\max}}{\alpha_x S(m_x, c_m) + (1-\alpha_x)S(s_x, c_m)}\right) \quad (24)$$

and the color $m_{x_c}$ is designated the current mask color $c_m = m_{x_c}$. A color similarity value is computed for the main and secondary color of each pixel within the brush radius using the mask color $c_m$. In one embodiment this is accomplished using the following equations:

$$S(m_x, c_m) = \min(1, 2e^{-(m_x - c_m)^2/2\sigma_d}), \text{ and} \quad (21)$$

$$S(s_x, c_m) = \min(1, 2e^{-(s_x - c_m)^2/2\sigma_d}), \quad (22)$$

The mask variance $\sigma_d$ controls the range of colors that are added to the mask, and is either a prescribed default range around the user specified mask color or is specified by the user. Next, the main and secondary colors for all pixels x within the drawing radius are considered for inclusion in the mask using the update functions:

$$\delta^t_{m_x} = S(m_x, c_m)\min\left(1, \frac{\delta^{t-1}_{x,\max}}{\alpha_x S(m_x, c_m) + (1-\alpha_x)S(s_x, c_m)}\right) \quad (23)$$

and $$\delta^t_{s_x} = S(s_x, c_m)\min\left(1, \frac{\delta^{t-1}_{x,\max}}{\alpha_x S(m_x, c_m) + (1-\alpha_x)S(s_x, c_m)}\right) \quad (24)$$

where $\delta_{x,\max}^{t-1}$ is the maximum $\delta_{x'}^{t-1}$ for all pixels x' in a prescribed-sized neighborhood of x. This ensures the mask is a single coherent region. In tested embodiments, the prescribed-sized neighborhood was an 8-connected pixel neighborhood, although smaller or larger neighborhoods could be used. Whenever the value of $\delta_{m_x}$ or $\delta_{s_x}$ for a particular iteration t exceeds a prescribed similarity threshold value, the pixel x is included in the mask area.

The foregoing techniques are repeated for each new pixel location on the brush motion path, as the user moves the virtual brush through the area to be masked. New pixels meeting the foregoing criteria are added to the mask. In addition, as the mask is being generated, the particular editing operation that is to be performed on pixels within the mask is implemented dynamically on each pixel added to the mask. Some examples of these editing operations include the following. If the editing operation is to change the color of the pixels in the mask, as pixels are added to the mask, their color is changed. It is noted that when the pixel is a mixed pixel (as would typically be found at the edge of the masked area), and one of its colors has been found similar enough to the mask color to include the pixel in the mask, only that color is changed. In this way the pixel will take on a new overall color that will smooth the transition between the masked area and the region outside the mask.

It is further noted that, in general, any image editing operation that it is desired to perform on only a portion of the image can be dynamically applied in the foregoing manner. For example, any of the noise reduction or global operations described previously could be performed dynamically on a portion of the image. In addition, image editing operations such as dodge and burn where portions of an image are brightened, while others are darkened, to emphasize certain parts of an image, can be implemented dynamically using the foregoing technique. Still further, selectively blurring portions of an image can be implemented dynamically using the foregoing technique.

In some cases the object that it is desired to edit in an image may be an area of high texture. It is possible that the pixels in this area could vary in color enough that not all of them would be included in the mask in one painting motion through the area because the color specified as indicative of the pixels that belong to the desired mask area differs too much. The user could specify a different color corresponding to an excluded mask pixel as the indicative color and repeat the drawing motion to add additional pixels. This procedure would be repeated until the user is satisfied all the desired pixels are included in the mask. However, as the present dynamic masking technique works faster with areas of constant color (because the user can specify one indicative color and add all the desired mask pixels to the mask in one drawing motion), another method could be employed to edit highly textured areas. If the region of the image surrounding the high texture area is less textured, it may be quicker to employ an erasure mask procedure. This latter procedure entails first masking out the entire area of high texture and some of the surrounding region using conventional masking methods that ignore the color information provided by the present four-layer image representation. Generally, these conventional methods just select all the pixels within a specified brush radius of the cursor as it is moved through the area of the image containing the high texture region that is to be edited. An erasure mask is then generated using the foregoing dynamic masking technique by the user selecting a pixel color indicative of the region surrounding the high texture region. The extent of the erasure mask should cover at least all the pixels in the region surrounding the high texture area that were included in the initial mask. The erasure mask is then combined with the initial mask to create a final mask of the high texture region being edited. Basically, what occurs is the pixels in the erasure mask are eliminated from the initial mask to create the final mask. The editing operation can be performed on the pixels of the final mask area. Alternately, if the editing is done dynamically as the initial mask was created, the application of the erasure mask would entail not eliminating pixels from the initial mask but restoring those pixels in the erasure mask to their original states.

3.0 Other Embodiments

Figure 14:
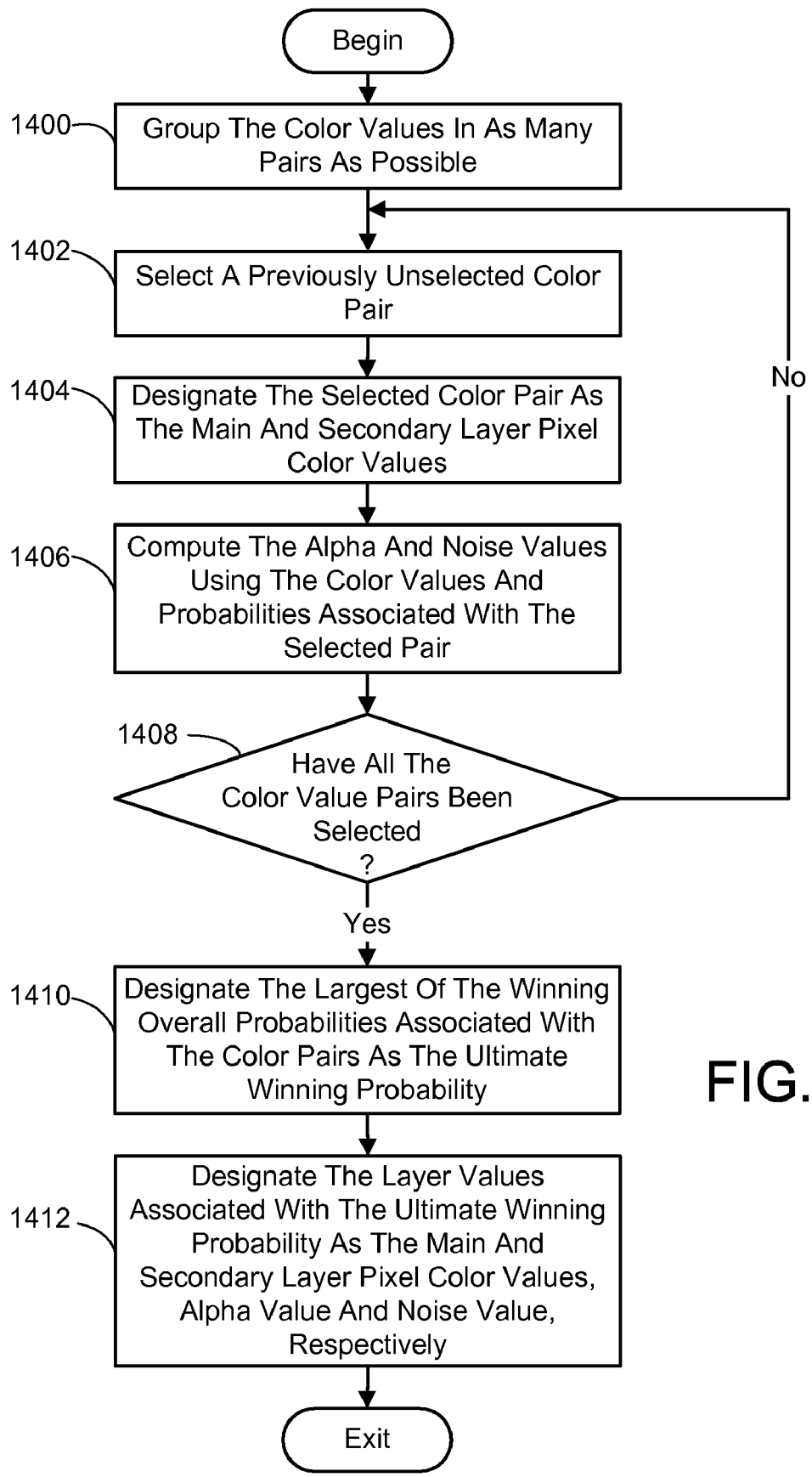
FIG. 14 is a flow diagram generally outlining an alternate embodiment of a process for generating the main and secondary pixel color layers of the present layered representation of an image using more than one pair of clustered colors.

In the foregoing description of embodiments for generating the four-layer image representation, a single pair of main and secondary color values and associated probabilities were established before going on to compute the alpha and noise values for a pixel location of the image being processed. However, in another embodiment, the clustering procedure can be used to identify more than just one pair of possible main and secondary layer pixel color values. In general, the clustering procedure can be used to identify any number of color values greater than two (i.e., three or more). Referring to FIG. 14, for each location in the image, the color values are grouped in as many pairs as possible (1400). A previously unselected color pair is then selected (1402) and is designated as the main and secondary layer pixel color values in the manner described previously (1404). The color values (and probabilities) associated with the selected pair are then used to compute the alpha and noise values for a pixel location (1406) as described in Section 2.2.2. Thus, for every pair of color values and associated probabilities, a "winning" overall probability is computed. It is next determined if all the color value pairs have been selected (1408). If not, actions 1402 through 1408 are repeated. Once all the color value pairs have been selected and processed, the largest of the winning overall probabilities is designated as the ultimate winning probability (1410) and the layer values associated with this probability are designated as the main and secondary layer pixel color values, alpha value and noise value for the pixel location being considered (1412).

Once all the pixel locations have been processed in the foregoing way, the refinement technique of Section 2.2.3 can be performed if desired using the same pair-wise color value scheme.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for editing an image that has been decomposed into a layered representation comprising,
   a main color layer comprising a pixel value for each pixel location of the image, wherein each main color layer pixel value specifies a pixel color deemed to be a majority contributor to the associated pixel location;
   a secondary color layer comprising a pixel value for each pixel location of the image, wherein each secondary color layer pixel value specifies a pixel color deemed to be a minority contributor to the associated pixel location;
   an alpha layer comprising a pixel value for each pixel location of the image, wherein each alpha layer pixel value specifies a proportion of the contribution of the majority contributor pixel color to the associated pixel location; and
   a noise layer comprising, for each pixel location of the image, a pixel value which specifies the difference in color between an alpha weighted sum of the majority and minority contributor colors of the pixel location under consideration, and an observed color of that pixel location,
   said process comprising using a computer to perform the following process actions:
   manipulating the pixel values of one or more pixel locations of one or more of said layers to effect a change therein; and
   combining the layers such that every pixel location in the image is assigned a value based on an alpha weighted sum of the main and secondary layer color values, with the noise layer value added in, using the pixel values of the layers assigned to the pixel location under consideration.

2. The process of claim 1, wherein the process action of manipulating the pixel values of one or more pixel locations of one or more of said layers, comprises the actions of:
   decomposing the noise value for each pixel location of the noise layer into separate noise components representing an illumination noise component, a chrominance noise component and an outlier noise component;
   scaling the magnitude of one or more of the noise components of one or more of the pixel locations of the noise layer, said scaling comprising independently increasing or decreasing the magnitude of a noise component by any amount desired, including zeroing out a noise component magnitude;
   respectively recombining the noise components associated with each pixel location of the noise layer to produce recombined noise values; and
   assigning the resulting noise values to their respective noise layer pixel locations.

3. The process of claim 2, wherein the process action of scaling the magnitude of one or more of the noise components of one or more of the pixel locations of the noise layer, comprises an action of zeroing out the illumination and chrominance noise component magnitudes.

4. The process of claim 2, wherein the process action of scaling the magnitude of one or more of the noise components of one or more of the pixel locations of the noise layer, comprises the actions of:
   zeroing out the chrominance noise component magnitude; and
   reducing the illumination noise component magnitude.

5. The process of claim 2, wherein the process action of scaling the magnitude of one or more of the noise components of one or more of the pixel locations of the noise layer, comprises an action of reducing the magnitude of one or more of the noise components of pixel locations exhibiting a fractional alpha layer pixel value.

6. The process of claim 2, wherein the process action of scaling the magnitude of one or more of the noise components of one or more of the pixel locations of the noise layer, comprises an action of increasing the magnitude of one or more of the noise components of pixel locations exhibiting an intensity peak in comparison to surrounding pixel locations.

7. The process of claim 2, wherein the process action of scaling the magnitude of one or more of the noise components of one or more of the pixel locations of the noise layer, comprises an action of reducing the chrominance noise component magnitude of pixel locations exhibiting a peak in color noise.

8. The process of claim 1, wherein the process action of manipulating the pixel values of one or more pixel locations of one or more of said layers, comprises, for a pixel location under consideration, the actions of:
applying an image manipulation function which varies with a particular pixel characteristic to the main layer pixel color value to generate a revised main layer pixel color value;
applying the image manipulation function to the secondary layer pixel color value to generate a revised secondary layer pixel color value; and
assigning the revised main and secondary layer pixel color values to the pixel location under consideration in the main and secondary layers, respectively.

9. The process of claim 8, wherein the image manipulation function comprises one of (I) a contrast function, (ii) a gamma correction function, and (iii) a color curve function.

10. The process of claim 8, further comprising performing prior to performing the process action of combining the layers, an action of manipulating the noise layer value of each pixel location under consideration to affect the noise exhibited by the layers once combined.

11. The process of claim 1, wherein the process action of manipulating the pixel values of one or more pixel locations of one or more of said layers, comprises, for a pixel location under consideration, the actions of:
decomposing the noise value of the pixel location under consideration into separate noise components representing an illumination noise component, a chrominance noise component and an outlier noise component;
adding the outlier noise component to the main and secondary layer pixel color values of the pixel location under consideration to produce revised main and secondary layer pixel color values;
combining the illumination and chrominance noise components of the pixel location under consideration to produce a revised noise layer value; and assigning the revised noise layer value to the noise layer pixel location corresponding to the pixel location under consideration;
applying an image manipulation function which varies with a particular pixel characteristic to the revised main layer pixel color value to generate a final main layer pixel color value;
applying the image manipulation function to the revised secondary layer pixel color value to generate a final secondary layer pixel color value; and
assigning the final main and secondary layer pixel color values to the pixel location under consideration in the main and secondary layers, respectively.

12. A computer-readable storage medium having computer-executable instructions stored thereon for performing the process actions recited in claim 1.

13. A computer-implemented process for editing an image, comprising:
using a computer to perform the following process actions,
characterizing the image as a layered representation comprising,
a main color layer comprising a pixel value for each pixel location of the image, wherein each main color layer pixel value specifies a pixel color deemed to be a majority contributor to the associated pixel location,
a secondary color layer comprising a pixel value for each pixel location of the image, wherein each secondary color layer pixel value specifies a pixel color deemed to be a minority contributor to the associated pixel location,
an alpha layer comprising a pixel value for each pixel location of the image, wherein each alpha layer pixel value specifies a proportion of the contribution of the majority contributor pixel color to the associated pixel location, and
a noise layer comprising, for each pixel location of the image, a pixel value which specifies the difference in color between an alpha weighted sum of the majority and minority contributor colors of the pixel location under consideration, and an observed color of that pixel location;
manipulating the values of one or more of said layers for pixel locations in a selected region of the image being edited;
combining the layer values of each pixel location in the selected region by computing an alpha weighted sum of the main and secondary layer color values, with the noise layer value added in, to produce a revised pixel value for each location in the selected region; and
replacing the existing pixel values of each pixel location in the selected region with the revised pixel value for that location.

14. The process of claim 13, wherein the process action of manipulating the values of one or more of the layers for pixel locations in a selected region of the image being edited, comprises the actions of:
inputting a parameter defining a search region extending out from a selected pixel location in the image, wherein pixel locations falling at least partially within the search region are to be considered for inclusion in a desired mask area representing said selected region of the image;
inputting the pixel location of a pixel whose color is to be used as a basis for determining if a pixel location being considered for inclusion is to be included in the mask area;
designating the main layer pixel color value of the inputted pixel location as a mask color;
inputting a manipulation instruction which specifies a change that is to be performed on the pixel value of one or more of the layers associated with pixel locations included in the mask area;
for each pixel location within said search region,
computing a first measure indicating the similarity of the main layer pixel color value of the pixel location under consideration to the mask color,
computing a second measure indicating the similarity of the secondary layer pixel color value of the pixel location under consideration to the mask color, determining if either the first or second similarity measure exceeds a prescribed similarity threshold, whenever either the first or second similarity measure exceeds the prescribed similarity threshold, including the pixel location under consideration in the mask area, and performing said change specified by the manipulation instruction on the pixel value of the one or more layers involved whenever the pixel location under consideration is included in the mask area.

15. The process of claim 14, wherein the change specified by the manipulation instruction is to change the color of the pixel location within the mask area to a new color, and wherein the process action of performing said change comprises an action of changing only the main layer pixel color value to the new color whenever the first similarity measure exceeds the prescribed similarity threshold and changing only the secondary layer pixel color value to the new color whenever the second similarity measure exceeds the prescribed similarity threshold.

16. The process of claim 14, further comprising the actions of:
(a) selecting a new pixel location in the image to act as a center of the search region;
(b) for each pixel location within said search region not already included in the mask area,
   (b1) computing a first measure indicating the similarity of the main layer pixel color value of the pixel location under consideration to the mask color,
   (b2) computing a second measure indicating the similarity of the secondary layer pixel color value of the pixel location under consideration to the mask color,
   (b3) determining if either the first or second similarity measure exceeds a prescribed similarity threshold,
   (b4) whenever either the first or second similarity measure exceeds the prescribed similarity threshold, including the pixel location under consideration in the mask area, and
   (b5) performing said change specified by the manipulation instruction on the pixel value of the one or more layers involved whenever the pixel location under consideration is included in the mask area; and
(c) repeating actions (a) through (b5), until all the pixels in the desired mask area have been changed.

17. The process of claim 13, wherein the process action of manipulating the values of one or more of the layers for pixel locations in a selected region of the image being edited, comprises the actions of:
(a) initially selecting pixel locations in a region of the image that it is desired to manipulate as well as pixels surrounding the region;
(b) inputting a parameter defining a search region extending out from a currently chosen pixel location in the image, wherein pixel locations falling at least partially within the search region are to be considered for inclusion in an erasure mask area representing said selected region of the image;
(c) inputting the pixel location of a base pixel whose color is to be used as a basis for determining if a pixel location being considered for inclusion is to be included in the erasure mask area;
(d) designating the main layer pixel color value of the inputted base pixel location as a erasure mask color;
(e) for each pixel location within said search region,
   (e1) computing a first measure indicating the similarity of the main layer pixel color value of the pixel location under consideration to the mask color,
   (e2) computing a second measure indicating the similarity of the secondary layer pixel color value of the pixel location under consideration to the mask color,
   (e3) determining if either the first or second similarity measure exceeds a prescribed similarity threshold,
   (e4) whenever either the first or second similarity measure exceeds the prescribed similarity threshold, including the pixel location under consideration in the erasure mask area, and
   (e5) whenever the pixel location under consideration is included in the erasure mask area and was one of the initially selected pixel locations, deselecting the pixel location;
(f) choosing a new current pixel location in the image, and repeating actions (e1) through (e5) for each pixel location within said search region, until only pixels within the desired region remain selected; and
(g) designating the remaining selected pixel locations as the final locations.

18. The process of claim 17, further comprising the process actions of:
inputting a manipulation instruction which specifies a change that is to be performed on the pixel value of one or more of the layers associated with the final locations; and
performing said change specified by the manipulation instruction on the pixel value of the one or more layers involved for each of the final locations.

19. The process of claim 17, further comprising the process actions of:
prior to performing the process action of inputting the parameter defining a search region,
   inputting a manipulation instruction which specifies a change that is to be performed on the pixel value of one or more of the layers associated with the initially selected pixel locations,
   performing said change specified by the manipulation instruction on the pixel value of one or more of the layers associated with each of the initially selected pixel locations, and
   whenever a pixel location is deselected, returning it to its original un-manipulated state.

20. The process of claim 13, wherein the process action of manipulating the values of one or more of said layers for pixel locations in a selected region of the image being edited, comprises at least one of:
(a) manipulating the noise layer to affect the noise exhibited by the pixels having locations within the selected region;
(b) increasing the intensity of the pixels having locations within the selected region;
(c) decreasing the intensity of the pixels having locations within the selected region;
(d) increasing the contrast of the pixels having locations within the selected region;
(e) decreasing the contrast of the pixels having locations within the selected region;
(f) increasing the gamma correction of the pixels having locations within the selected region;
(g) decreasing the gamma correction of the pixels having locations within the selected region; and
(h) blurring the pixels having locations within the selected region.

* * * * *

UNITED STATES PATENT AND TRADEMARK OFFICE
CERTIFICATE OF CORRECTION

| | | |
|---|---|---|
| PATENT NO. | : 7,593,020 B2 | Page 1 of 1 |
| APPLICATION NO. | : 11/420999 | |
| DATED | : September 22, 2009 | |
| INVENTOR(S) | : Charles Lawrence Zitnick, III et al. | |

It is certified that error appears in the above-identified patent and that said Letters Patent is hereby corrected as shown below:

Title page, item (75), under "Inventor" column 1, line 1, delete "Charles Zitnick, III," and insert -- Charles Lawrence Zitnick III, --, therefor.

In column 21, line 33, in Claim 9, delete "(I)" and insert -- (i) --, therefor.

Signed and Sealed this
Twenty-fifth Day of January, 2011

David J. Kappos
*Director of the United States Patent and Trademark Office*